(12) United States Patent
Plattner et al.

(10) Patent No.: US 9,424,332 B2
(45) Date of Patent: *Aug. 23, 2016

(54) AVAILABLE-TO-PROMISE ON AN IN-MEMORY COLUMN STORE

(71) Applicant: Hasso-Plattner-Institut fur Softwaresystemtechnik GmbH, Potsdam (DE)

(72) Inventors: Hasso Plattner, Schriesheim (DE); Alexander Zeier, Berlin (DE); Christian Tinnefeld, Potsdam (DE); Stephan Heinz Mueller, Potsdam (DE); Sebastian Hillig, Potsdam (DE)

(73) Assignee: HASSO-PLATTNER-INSTITUT FUR SOFTWARESYSTEMTECHNIK GMBH, Potsdam (DE)

( * ) Notice: Subject to any disclaimer, the term of this patent is extended or adjusted under 35 U.S.C. 154(b) by 347 days.

This patent is subject to a terminal disclaimer.

(21) Appl. No.: 14/075,171

(22) Filed: Nov. 8, 2013

(65) Prior Publication Data

US 2014/0067752 A1 Mar. 6, 2014

Related U.S. Application Data

(63) Continuation of application No. 13/269,474, filed on Oct. 7, 2011, now Pat. No. 8,601,038.

(60) Provisional application No. 61/391,106, filed on Oct. 8, 2010.

(51) Int. Cl.
*G06F 17/30* (2006.01)
*G06Q 10/08* (2012.01)

(52) U.S. Cl.
CPC ......... *G06F 17/30592* (2013.01); *G06Q 10/08* (2013.01)

(58) Field of Classification Search
USPC .......................... 707/607; 705/7.31, 26.1, 330
See application file for complete search history.

(56) References Cited

U.S. PATENT DOCUMENTS

| | | | | |
|---|---|---|---|---|
| 7,480,623 | B1 * | 1/2009 | Landvater | ........ G06Q 10/06315 705/7.25 |
| 7,539,630 | B2 | 5/2009 | Crampton et al. | |
| 7,552,066 | B1 * | 6/2009 | Landvater | ........ G06Q 10/06315 705/7.25 |
| 8,005,761 | B1 * | 8/2011 | Braumoeller | ........ G06Q 10/083 705/330 |

(Continued)

OTHER PUBLICATIONS

Internet Search; The ACM Digital Library; web-page; printed Jul. 26, 2013; 3 pages.

(Continued)

*Primary Examiner* — Debbie Le
(74) *Attorney, Agent, or Firm* — Fountainhead Law Group P.C.

(57) ABSTRACT

A system and method of determining an earliest delivery date for a demand on the basis of a fact table stored in a database, where the demand indicates both a desired date and a desired quantity for items from a stock, where a fact time series is comprised by and/or deducible from the fact table, and where the fact time series comprises fact tuples indicating both a fact date and a change in quantity of stock items that occurred on this fact date. The method includes generating an aggregated time series from the fact time series by defining and/or obtaining discrete time intervals, and generating, for at least one discrete time interval, an aggregated tuple indicating both its corresponding discrete time interval and the aggregated change in quantity of stock items that occurred in its corresponding discrete time interval.

22 Claims, 13 Drawing Sheets

Simplified physical schema

(56) References Cited

U.S. PATENT DOCUMENTS

| | | | |
|---|---|---|---|
| 8,069,086 B2* | 11/2011 | von Helmolt | G06Q 10/087 705/22 |
| 8,601,038 B2* | 12/2013 | Plattner | G06Q 10/08 705/330 |
| 8,666,846 B1 | 3/2014 | Chenault et al. | |
| 2002/0147602 A1* | 10/2002 | Helms | G06Q 10/0833 705/333 |
| 2005/0114235 A1 | 5/2005 | Snyder et al. | |
| 2007/0016463 A1 | 1/2007 | Borders et al. | |
| 2009/0094085 A1 | 4/2009 | Kantarjiev et al. | |
| 2009/0125385 A1* | 5/2009 | Landvater | G06Q 10/06315 705/7.31 |
| 2011/0320417 A1 | 12/2011 | Luo et al. | |
| 2012/0265728 A1 | 10/2012 | Plattner et al. | |

OTHER PUBLICATIONS

Internet Search; IEEE Xplore; web-page; printed Jul. 26, 2013; 1 page.

Google Search; web-page; printed Jul. 26, 2013; 1 page.

\* cited by examiner

Figure 1: Simplified physical schema

Figure 2: Simplified ERM

Figure 3: Time series calculation

Figure 4: Candidate check example

Figure 5: Net time series aggregates

Figure 6: Varying dataset size

Figure 7: Single check

Figure 8: Single CVC access

Figure 9: Disjoint CVC access

Figure 10: Performance during merge

| | id | date_id | cvc_id | demand_id | demand_quantity | quantity | object_type |
|---|---|---|---|---|---|---|---|
| 1101 | 5 | 1286668800 | 1 | 5 | -45 | 0 | 3 |
| 1102 | 6 | 1286668800 | 1 | 5 | 0 | -45 | 1 |
| 1103 | 7 | 1286409600 | 1 | 0 | 500 | 500 | 2 |
| 1104 | 8 | 1286323200 | 2 | 3 | -10 | 0 | 4 |

Table 1: Fact table extract

Figure 11

```
1  def candidates(time_series, desired_date, desired_qty):
2      candidates = []
3      acquired = 0
4      accumulated = 0
5      for date, qty in time_series:
6          accumulated += qty
7          # do not start before desired_date
8          if date < desired_date:
9              continue
10         if accumulated > 0:
11             wanted = desired - acquired  # pending quantity
12             if wanted > 0:
13                 if accumulated >= wanted:
14                     # total covering of wanted quantity
15                     candidates.append((date, wanted))
16                     acquired = desired
17                     accumulated -= wanted
18                 else:
19                     # partial covering
20                     candidates.append((date, accumulated))
21                     acquired += accumulated
22                     accumulated = 0
23         elif (accumulated < 0) and (len(candidates) > 0):
24             # acquired too much, give back until
25             # accumulated is not negative
26             candidates.truncate_qty(accumulated, aquired)
27     return candidates
```

Listing 1: Candidate Check

Figure 12

```
SELECT SUM(Fact.quantity), MAX(Fact.date_id)
FROM Fact
WHERE Fact.cvc_id = 1
GROUP BY Fact.date_year, Fact.date_month, Fact.date_day
ORDER BY MAX(Fact.date_id)
```

Listing 2: Candidate check aggregation

Figure 13

AVAILABLE-TO-PROMISE ON AN IN-MEMORY COLUMN STORE

CROSS REFERENCE TO RELATED APPLICATIONS

The present application is a continuation of U.S. application Ser. No. 13/269,474 filed Oct. 7, 2011, which claims priority to U.S. Provisional App. No. 61/391,106 filed Oct. 8, 2010, both of which are incorporated herein by reference.

BACKGROUND

1. Field of the Invention

The invention generally relates to an available-to-promise method executed and/or executable on a computer, the method being suitable for determining the earliest delivery date for a demand on the basis of a fact table, the demand specifying a desired date and a desired quantity for items from a stock, the fact table being stored in a database connected to the database management system. The invention further relates to a computer comprising means for performing such a method and to a computer program that, when run on a computer, carries out such a method.

2. Description of the Related Art

Unless otherwise indicated herein, the approaches described in this section are not prior art to the claims in this application and are not admitted to be prior art by inclusion in this section.

There is an ongoing discussion in the database community to what extent applications may benefit from a database management system (DBMS) that exactly suits their needs. One central paper in this discussion is written by Stonebraker and Çetintemel [Michael Stonebraker and Ugur Çetintemel. "One Size Fits All": An Idea Whose Time Has Come and Gone (Abstract). In ICDE, pages 2-11. IEEE Computer Society, 2005] who argue that applications, such as text search, scientific applications, data warehousing, and stream processing, can benefit in view of performance, maintenance, and functionality by using application specific database engines. According to Krueger et al. [Jens Krüger, Christian Tinnefeld, Martin Grund, Alexander Zeier, and Hasso Plattner. A case for online mixed workload processing. In Shivnath Babu and G. N. Paulley, editors, DBTest. ACM, 2010], this statement holds true for the domain of traditional enterprise applications and—as exemplified in this patent application—particularly for an available-to-promise (ATP) application.

ATP applications typically relate to supply chain management (SCM) systems and provide a checking method that determines whether items of desired products of a customer order can be delivered on a requested date. This functionality is achieved by comparing the quantities of items of a desired product that are in stock or scheduled for production with the quantities that are assigned to already promised orders [Jörg Thomas Dickersbach. Supply Chain Management with APO. Springer, Berlin, Heidelberg, 2005, Rainer Scheckenbach and Alexander Zeier. Collaborative SCM in Branchen. Galileo Press GmbH, Bonn, 2003]. Product in the sense of this patent application is a category of items, the items of this category exhibiting specific characteristics. To this regard, an item may be any commodity, such as a tangible good, physical object, or an intangible service, in so far as the commodity may be booked or reserved for discrete time intervals.

A common technique in current SCM systems with ATP functionality is using materialized aggregates for keeping track of the different stock item quantities, materialized aggregates being database objects containing copies of query results (e.g., results of an ATP check). In particular, an individual materialized aggregate is provided not only for each different product but also for each time interval of interest. These materialized aggregates are continuously updated so that a new item of a product in stock increases the value of the corresponding materialized aggregate while the assignment of items of a product to a confirmed customer order decreases the latter.

SUMMARY

Although the use of materialized aggregates reduces the necessary amounts of I/O operations and CPU cycles for the single ATP check itself, the following technical problems and/or disadvantages arise:

Redundant Data. One problem that arises in association with materialized aggregates is the need for data replication and for complex synchronization strategies [Hasso Plattner. A Common Database Approach for OLTP and OLAP Using an In-Memory Column Database. Read, 2009]. In order to preserve a consistent view on the data across the whole system, every write operation has to be propagated to all replications (i.e., materialized aggregates). Even if the updates are triggered immediately, updates still result in delays causing temporary inconsistencies. Additionally, even if the amount of I/O operations and CPU cycles is reduced to a minimum for the ATP check itself by using aggregates, the overall sum of needed operations may be higher due to synchronization, maintenance, and costly back calculation of the materialized aggregates.

Exclusive Locking. A related issue consists in locking for update operations. All modifications to a materialized aggregate require exclusive access to the respective database entity and block concurrent read and write processes. The downside of locking is obvious: locking queues the incoming requests and therefore affects the performance significantly in case of a highly parallel workload.

Inflexible Data Querying. The gain in performance concerning isolated queries comes at the cost of decreased flexibility. Specifically, the rolled up data structures that are necessary for materialized aggregates are tailored for a predefined set of queries. Unforeseeable queries referring to attributes (that were not considered at design time) cannot be answered with these pre-aggregated materialized quantities. Those attributes include, for instance, shelf life, product quality, customer performance, and other characteristics of products, orders, or customers. Additionally, the temporal granularity of the check is fixed due to the use of aggregates. Once the aggregates are defined and created based on, e.g., available quantities per day, it is not possible to perform ATP checks at a granularity of an hour.

Inflexible Data Schema Extensions. The previously mentioned inability of changing the temporal granularity of a single check points towards a related disadvantage: the inability to change the data schema once an initial definition has been laid out. In fact, the change of the temporal ATP check granularity or the inclusion of a previously unconsidered attribute is only possible by means of a cumbersome reorganization of the existing data.

No Data History. Maintaining materialized aggregates instead of recording all transactions (enriched with information of interest) means losing track of how the materialized aggregates have been modified. In other words: no historic information is available for analytics or for rescheduling processes. As stated above, the evolution of business needs indicates an increasing relevance of sophisticated analytical applications. For implementing fast responses to arbitrary analytical queries without time consuming extract, transform and load (ETL) processes, raw data in a format that enables on-the-fly processing is needed.

The present applicant has devised and embodied this invention to overcome these shortcomings and to obtain further advantages. The invention is set forth and characterized in the main claims, while the dependent claims describe other characteristics of the invention.

A first aspect relates to an available-to-promise method executed and/or executable on a computer, preferably on a database management system. The method is suitable for determining the earliest delivery date for a demand on the basis of a fact table.

The fact table may be stored in a database connected to the computer. The fact table typically relates to a stock and the quantity of items (of a certain type of product) comprised by the stock. In particular, the fact table typically contains entries that relate to historic and future events that have changed or will change the quantity of items comprised by the stock. Thereby, the quantity of stock items that is in the stock at present and is planned and/or scheduled to be in the stock at any time in the future may be derived. Depending on how long the fact table maintains historic data, the quantity of stock items that was in the stock may also be derived for the past. Preferably, the fact table is self-consistent, meaning that the quantity of stock items is negative at no point in time. Preferably, the fact table substantially reflects the real quantity of stock items in the stock.

The demand indicates both a desired date and a desired quantity for items from a stock. The desired date is typically a future date and the desired quantity specifies the amount of items (of a certain type/product) that is demanded at the desired date. The demand may be data resulting from, for example, a user input, an automatically generated input or the like. "Indicate" in this sense is to be understood so that, e.g., the demand may contain any kind of information suitable for determining the desired date and the desired quantity. Consequently, the demand does not necessarily contain information suitable for explicitly and/or directly determining the desired date and the desired quantity. The demand may also contain information suitable for implicitly and/or indirectly determining the desired date and the desired quantity. In the latter case, a deciphering algorithm and/or a key may even be required for determining the desired date and the desired quantity from the information contained by the demand.

A fact time series is comprised by or deducible from the fact table, the fact time series comprising fact tuples indicating both a fact date and a change in quantity of stock items that occurred on this fact date. The fact date indicated by the fact tuples is not to be understood as a constant value. Rather, the fact dates indicated by the fact tuples is to be understood as variable. Typically, the fact tuples relate to real events, such as customer demands for stock items, promises for delivery of stock items, inputs of stock items to the stock, quantity of stock items in stock, and withdrawal entries indicating a withdrawal of stock items from the stock. The date of the event may be represented by the fact date indicated by the fact tuple corresponding to the event. The same applies to the change in quantity of stock items: the change in quantity of stock items associated with the event is represented by the change in quantity indicated by the fact tuple corresponding to the event. Therefrom, it is clear that the variables "fact date" and "change in quantity" may be different for different fact tuples according to the event that is represented by the fact tuples.

The method comprises multiple steps. In step (a), an aggregated time series is generated from the fact time series by: (a1) defining discrete time intervals; (a2) generating, for at least one discrete time interval (preferably for each time interval), an aggregated tuple indicating both its corresponding discrete time interval and the aggregated change in quantity of stock items that occurred in its corresponding discrete time interval. The discrete time intervals may be fixed; however, the discrete time intervals may also be user-defined. Particularly, the discrete time intervals may be specified by the demand. The aggregated change in quantity of stock items is the aggregated (in the sense of summed up or net) number of items that has left or entered the stock in a period of time. The period of time is further defined as "its corresponding discrete time interval", which is to be understood as the discrete time interval, for which the aggregated tuple is generated. Preferably, one aggregated tuple is generated for each discrete time interval. Preferably, the discrete time intervals are defined so that every date indicated by the fact tuples lies within one of the discrete time intervals. Preferably, the discrete time intervals are continuous in the sense that there is no gap between them.

In step (b), a candidate list is generated by traversing the aggregated time series forwards in time and thereby generating, for each discrete time interval, none or one candidate tuple indicating its corresponding discrete time interval and a booked quantity of stock items.

Traversing the aggregated time series forwards in time is preferably to be understood as calling up each aggregated tuple of the aggregated time series one by one, beginning with the aggregated tuple indicating the oldest time interval and continuing with the aggregated tuple next with regard to its time interval. For each called up aggregated tuple (and thereby for each time interval), none or one candidate tuple is generated. The desired date, the desired quantity, and the aggregated tuples preferably form the basis for determining whether none or one candidate tuple is generated and, if a candidate tuple is generated, for determining what kind of candidate tuple is generated.

Preferably, a candidate tuple is only generated if, in its corresponding discrete time interval, stock items are available and not previously booked by previously generated candidate tuples, and if the sum of all previously booked stock items is smaller than the desired quantity, so that the discrete time interval indicated by the lastly generated candidate tuple is the earliest delivery date for the demand. The lastly generated candidate tuple is also that candidate tuple indicating the latest time interval of all generated candidate tuples. The term "its corresponding discrete time interval" refers to the discrete time interval, for which the candidate tuple is created. Preferably, stock items are considered available, if (virtually) removing them from the stock does not result in a negative quantity of stock items for anyone of the discrete time intervals. Preferably, stock items are considered booked, if a generated candidate tuple indicates them as booked. Preferably, stock items are only booked if booking and/or removing them from stock is in fact possible (in this discrete time interval) and if booking does not interfere with already promised removals from the stock. For this purpose, already booked removals should be indicated by means of corresponding promise entries in the fact table.

The purpose of this aspect is to achieve computer implemented ATP functionality without maintaining materialized aggregates. This purpose is achieved by storing all individual data records (e.g., facts) in a database (e.g., in a fact table) and scanning through all relevant records on-the-fly for each ATP check, i.e., each time the ATP method is called up. In contrast, a human being without computer support would achieve ATP functionality differently: in accordance with the prior art, the human being would maintain a materialized aggregate for each time interval because scanning through all relevant records would be extremely inefficient, in particular if thousands, millions, or even billions of records must be taken into account. Instead of going through this many records, the human being would merely maintain multiple materialized aggregates, for example, a materialized aggregate for each time interval. Undoubtedly, the human being would not scan through all relevant records for each ATP check. The computer, however, is capable of efficiently reading all relevant records from a database, in particular from an in-memory, column store database. Accordingly, the method has been designed in such a way as to be especially suitable for being performed on a computer, taking into account the underlying working principles of a computer.

In a preferred embodiment, the stock items available are determined on the basis of the aggregated time series. The aggregated tuples are analyzed and the stock items available are determined for the discrete time intervals of interest, preferably for each discrete time interval.

In another preferred embodiment, the aggregated time series is determined on the basis of those fact tuples having dates included in the corresponding discrete time interval. The aggregated time series contains aggregated tuples that indicate their respective discrete time intervals and respective aggregated changes in quantity of stock items that occurred in their respective discrete time intervals. Preferably, each aggregated change in quantity may be determined from those fact tuples having dates included in the corresponding discrete time interval because said fact tuples indicate all changes in quantity that have occurred in said discrete time interval; consequently, the all changes in quantity (that have occurred in said discrete time interval) need simply to be summed up.

In another preferred embodiment, the step (b) is further characterized in that a candidate tuple is only generated if its corresponding time interval is equal to a desired time interval or next with regard to time to the desired time interval, the desired time interval comprising the desired delivery date. This embodiment is advantageous if the desired quantity is not required earlier than the desired date.

In another preferred embodiment, the sum of the booked quantities of stock items as indicated by the candidate tuple(s) of the generated candidate list equals the desired quantity. That means that in the end, after the available-to-promise method has terminated, summing up the booked quantities as indicated by all candidate tuples of the candidate list results in the desired quantity.

In another preferred embodiment, the step of traversing the aggregated time series comprises the steps of: (b1) setting a loop time interval equal to the discrete time interval including the desired date and setting a wanted quantity equal to the desired quantity; (b2) setting an accumulated quantity equal to the sum of aggregated changes as indicated by those aggregated tuples that indicate discrete time intervals ranging from the earliest defined discrete time interval to the loop time interval; (b3) if the wanted quantity is larger than zero and if the accumulated quantity is larger than or equal to the wanted quantity, (b31) generating a candidate tuple indicating the loop time interval as its corresponding discrete time interval and the wanted quantity as the booked quantity; (b32) reducing the accumulated quantity by the wanted quantity; (b33) setting the wanted quantity equal to zero; (b4) if the wanted quantity is larger than zero and if the accumulated quantity is positive and smaller than the wanted quantity, (b41) generating a candidate tuple indicating the loop time interval as its corresponding discrete time interval and the accumulated quantity as the booked quantity; (b42) reducing the wanted quantity by the accumulated quantity; (b43) setting the accumulated quantity equal to zero; (b5) if the accumulated quantity is negative, (b51) reducing the booked quantities of the generated candidate tuple(s) by the accumulated quantity, wherein each candidate tuple indicating a desired quantity of zero is preferably deleted; and (b52) increasing the wanted quantity by the accumulated quantity; (b53) setting the accumulated quantity equal to zero; (b6) if at least one aggregated tuple exists that indicates a discrete time interval subsequent to the loop time interval, (b61) setting the new loop time interval equal to the discrete time interval of the aggregated tuple next in time with regard to the aggregated tuple indicating the current loop time interval; and (b62) increasing the accumulated quantity by the quantity indicated by the aggregated tuple indicating the loop time interval; (b63) repeating steps (b3) to (b63).

With reference to step (b51), reducing the quantity preferably means the following: if the candidate tuple, for example, indicates n as the booked quantity then reducing the candidate tuple by x results in an amended candidate tuple indicating n−x as booked quantity. However, the booked quantity must never become negative. If x is larger than n, than the next older candidate tuple (the candidate tuple next in the candidate list) must be accordingly amended. These steps are repeated until the totally booked quantities are reduced by the accumulated quantity. This embodiment is an efficient method of determining the candidate list from the aggregated time series by means of a computer. An implementation of this embodiment is shown in listing 1 shown in FIG. 12.

In another preferred embodiment, step (a2) is further characterized in that an aggregated tuple is only created if the corresponding time interval includes at least one fact tuple, i.e. if at least one fact tuple indicates a date lying within the corresponding time interval. The corresponding time interval is the time interval that the aggregated tuple indicates if it is created.

In another preferred embodiment, the step of (b3) is further characterized by removing those aggregated tuples from the aggregated time series that indicate an aggregated quantity equal to zero.

In another preferred embodiment, the method further comprises the steps of: (c) generating, for at least one or each generated candidate tuple, a promise entry indicating both a promised quantity of stock items and a promised delivery date; and (d) storing the at least one or each generated promise entry in the fact table. These steps ensure that the fact table contains the promised (and therefore planned/scheduled) delivery of stock items. Thereby, an according quantity of promised stock items is reserved for the demand that has triggered this first instance of the available-to-promise method. In case another demand triggers a second (later) instance the available-to-promise method, the second instance of the available-to-promise method takes the promised quantity into account and generates a promise that does not interfere with the promise of the first instance. Accordingly, the self-consistency of the fact table, on which the available to promise method operates on, is preserved.

In another preferred embodiment, the method further comprises the steps of: receiving the demand from a customer, e.g., prior to step (a); and providing the customer with the discrete time interval of the lastly generated candidate tuple as the earliest delivery date for the customer demand, e.g., following step (d). For this purpose, the customer may employ any means for transmitting the demand to the computer. The customer may directly input the demand by an input interface. The customer may also indirectly input the demand via a network. In the latter case the customer may employ a client and the computer may itself be or be connected to a corresponding server and/or server machine, wherein the server may execute some or all remaining steps of this method.

In another preferred embodiment, the fact table entries comprise demand entries indicating a customer demand for stock items; promise entries indicating a promised delivery of stock items; input entries indicating input of stock items to the stock; stock level entries indicating the current quantity of stock items in stock; and withdrawal entries indicating a withdrawal of stock items from the stock.

In another preferred embodiment, no materialized aggregates stored in the database are employed for determining the earliest delivery date.

In another preferred embodiment, step (b51) is further characterized in that the booked quantities of the generated candidate tuple(s) are reduced by processing the candidate list backwards in time, i.e., the booked quantities of the lastly generated candidate tuple(s) are reduced first.

In another preferred embodiment, the method further comprises at least one concurrency control step ensuring that the same stock item is not promised for multiple different customer demands.

In another preferred embodiment, the method further comprises concurrency control steps: locking at least a part of the fact table, e.g., prior to step (a), so that other instances of the available-to-promise method cannot access the fact table; and unlocking the part of the fact table that was initially locked, e.g., subsequent to step (d).

In another preferred embodiment, the method further comprises concurrency control steps: reserving the desired quantity by generating a promise entry indicating the desired quantity as the promised delivery of stock items and the desired date as the delivery date; storing the generated promise entry in the fact table, e.g., prior to step (a); comparing the finally generated candidate list with the initially generated promise, e.g., subsequent to step (b), and, if necessary, amending the candidate list, preferably, so that the candidate list complies with new entries in the fact table that have been stored between step of initially generating a promise and the step of comparing the finally generated candidate list with the initially generated promise.

In another preferred embodiment, the method further comprises concurrency control steps: identifying the most recently stored entry in the fact table, e.g., prior to step (a); identifying entries stored in the fact table subsequent to the initially identified entry, e.g., subsequent to step (b); controlling the candidate list with regard to the new entries; and, if necessary, amending the candidate list so that the candidate list complies with new entries of the fact table.

In another preferred embodiment, the fact tuples indicate an id indicating the order, in which the entries have been stored in the fact table, and wherein the method further comprises concurrency control steps: retrieving the id of the most recently stored entry in the fact table, e.g., prior to step (a); identifying entries stored in the fact table subsequent to the entry with the retrieved id, on the basis of their id, e.g., subsequent to step (b); controlling the candidate list with regard to the new entries; and, if necessary, amending the candidate list so that the candidate list complies with new entries of the fact table.

In another preferred embodiment, the database is a column store database.

In another preferred embodiment, the database is an in-memory database that employs compression for storing the fact table in memory.

In another preferred embodiment, the database is an insert-only database.

In another preferred embodiment, the database employs lazy decompression.

A second aspect relates to a computer system, e.g., including a database system, comprising hardware components that performing one of the method embodiments as described above.

A third aspect relates to a computer program that, when run on a computer system, e.g., database management system, carries out one of the method embodiments as described above.

The above described aspects and preferred embodiments encompass many advantages and advantageous technical effects that may include one or more of the advantages and advantageous technical effects as set forth throughout this description and, in particular, as set forth in the following:

First, multiple advantageous technical effects follow from the fact that no materialized aggregates are required: less storage and less computational power is required; the performance is significantly improved to the extent that ATP checks are possible for situations in which ATP checks were not possible before. An example for such a situation is discussed with regard to benchmarking results at the end of this patent application.

In many existing systems, a problem arising in association with materialized aggregates is that data replication is required. In contrast, according to embodiments of the invention, no such data replication is required because according materialized aggregates are built up on the fly. This encompasses the advantageous technical effect that less data storage is required, which is particularly relevant for in-memory databases that rely on very expensive data storage.

In many existing systems, another problem arising in association with materialized aggregates is complex synchronization. First, delayed updates result in causing temporary inconsistencies within the database and the DBMS. Second, due to synchronization, maintenance, and costly back calculation of the materialized aggregates, the overall sum of operations required may be higher in the prior art (using materialized aggregates) than for embodiments of the invention. In contrast with many existing systems, embodiments of the invention do not make use of materialized aggregates; consequently, complex synchronization is not necessary and the following advantageous technical effects are provided: less overall computational power required for executing the ATP method and temporary inconsistencies are avoided within the database and the DBMS.

In many existing systems, another problem that arises in association with materialized aggregates consists of locking for update operations. All modifications to a materialized aggregate require (1) exclusive access to the respective database entity and (2) blocking concurrent read and write processes. The downside of locking is obvious: locking queues the incoming requests and affects the performance significantly in case of a highly parallel workload. In contrast, the described embodiments of the invention comprise the advantageous technical effects that no exclusive locking is required. Using multi-core technology and parallel computing, the performance of the ATP method is significantly increased to the extent that ATP checks are possible for situations in which ATP checks were not possible before.

Second, embodiments of the invention comprise a flexibility advantage. In many existing systems, ATP systems employ rolled up data structures that are tailored for a predefined set of queries. Unforeseeable operations referring to attributes that were not considered at design time cannot be answered with these pre-aggregated quantities. Additionally, the temporal granularity of the ATP check is fixed due to the use of materialized aggregates. On the contrary, embodiments of the invention build up aggregates on the fly for each demand; consequently, the ATP check is highly flexible in view of attributes included and temporal granularity. Different advantageous technical effects are provided: First, the ATP method does not have to be rebuilt (including cumbersome reorganization of the existing data) every time a new query type (which has previously not been thought of) is required. Consequently, computational power is saved. Finally, storage space is saved because no materialized aggregates must be maintained at all, whereas, in many existing systems, materialized aggregates are maintained that may never be required or that may only be required on very rare occasions.

Third, embodiments of the invention comprise the advantageous technical effect of providing data history. Maintaining materialized aggregates instead of recording all transactions enriched with information of interest means losing track of how the materialized aggregates have been modified. In other words: in many existing systems, no history information is available for analytics or for rescheduling processes. As stated above, the evolution of business needs indicates an increasing relevance of sophisticated analytical applications.

Fourth, embodiments of the invention employing in-memory databases comprise the advantageous technical effect that they facilitate fast and random access.

Fifth, further advantages and advantageous technical effects are provided by embodiments of the invention making use of column-stores: To be able to hold billions of data records in memory, high compression rates are mandatory. Embodiments that additionally store data column-wise comprise the advantageous technical effect that generally suitable compression techniques can be applied. The main reason for good compression results achievable in column-stores is the similarity of the entries in a column, since the compression ratio is often dominated by the number of distinct values [Jens Krüger, Martin Grund, Christian Tinnefeld, Jan Schaffner, Stephan Müller, and Alexander Zeier. Enterprise Data Management in Mixed Workload Environments. 2009 16th International Conference on Industrial Engineering and Engineering Management, pages 726-730, Oct. 10, 2009]. Further, many operations, notably aggregations, equi-joins, and selections, can be performed directly on compressed data [Daniel J. Abadi, Samuel R. Madden, and Nabil Hachem. ColumnStores vs. RowStores: How Different Are They Really? Proceedings of the 2008 ACM SIGMOD international conference on Management of data—SIGMOD '08, page 967, 2008; Goetz Graefe and Leonard D. Shapiro. Data Compression and Database Performance. pages 22-27, 1991]. Consequently, fewer entries have to be decompressed for reconstruction of tuples. This strategy—which is called lazy decompression [Zhiyuan Chen, Johannes Gehrke, and Flip Korn. Query Optimization In Compressed Database Systems. International Conference on Management of Data, 30(2), 2001]—helps to save CPU cycles for decompression. Particularly for in-memory databases, reducing computing time is highly relevant because I/O costs are extremely low so that CPU time influences the overall execution time significantly [Stavros Harizopoulos, Velen Liang, Daniel J. Abadi, and Samuel Madden. Performance Tradeoffs in Read-Optimized Databases. Very Large Data Bases, 2006]. This technique is especially beneficial in the context of insert-only because updates do not directly require a decompression of already stored values but result in appending new values for already existing tuples. Furthermore, the read-optimized columns can go along with a smaller, write-optimized delta store which is used for updates. Consequently, in column-oriented in-memory, databases aggregates can be calculated by processing the appropriate column without the need to read the entire table from disk or decompress it in advance. Thus, column-oriented database systems can operate on huge datasets efficiently and thereby comply with the requirements of an OLAP system very well [Peter A. Boncz, Stefan Manegold, and Martin L. Kersten. Database Architecture Optimized for the New Bottleneck: Memory Access. Very Large Data Bases, 1999]. They also bring along a new level of flexibility, since they are not confined to predetermined materialized aggregates. Write operations are not limited by the read-optimized data structure as they are performed in the delta store.

Sixth, embodiments of the invention provide analytics on ATP check history. The ability to analyze the history of ATP checks introduces two major advantages: on the one hand, a company can perform classical analytical tasks such as seeing which products were sold the most, which customer groups ordered which kinds of products in which time periods and the like. On the other hand, storing the complete history of ATP checks also including those ATP checks 5 that have not resulted in actual orders provides an important source of statistical information: companies may identify products that have been highly requested but were not ordered, e.g., because not enough quantities were available. Furthermore, a company may identify the most popular replacement products, e.g., which products were ordered in the end, although different products were initially included in the ATP check.

Seventh, embodiments of the invention provide instant order rescheduling. Promised orders and planned deliveries are based on a certain schedule of incoming products or planned production. However, these schedules and plans often turn out to be incorrect as products may not arrive on time or production goals can not be met. As a consequence, already promised orders have to be rescheduled. Using materialized aggregates (as in the prior art), this is a time-intensive process: the relevant materialized aggregates have to be back calculated to the point where the order in question was promised so that the new delivery date can be calculated considering the delayed production. Contrastingly, in embodiments of the invention, this operation can be done significantly faster because all relevant fine granular data is at hand. Here, including different attributes is of interest again because, for example, an existing customer who is about to place a new, high-volume order should obtain all orders promised to him on time—even if the quantities of available products are lower than expected.

The following detailed description and accompanying drawings provide a better understanding of the nature and advantages of the present invention.

BRIEF DESCRIPTION OF THE DRAWINGS

FIG. 11 is a table that shows an exemplary fact table extract on that an embodiment of the invention may operate.

FIG. 12 is a listing that shows an embodiment of the candidate check method according to the invention.

FIG. 13 is a listing that shows an embodiment of the candidate check aggregation method according to the invention.

DETAILED DESCRIPTION

Described herein are techniques for an ATP application embodiment based on a columnar, in-memory database. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

With reference to the attached figures, this section provides the underlying concepts of an ATP application embodiment based on a columnar, in-memory database.

Data Organization

Figure 1:
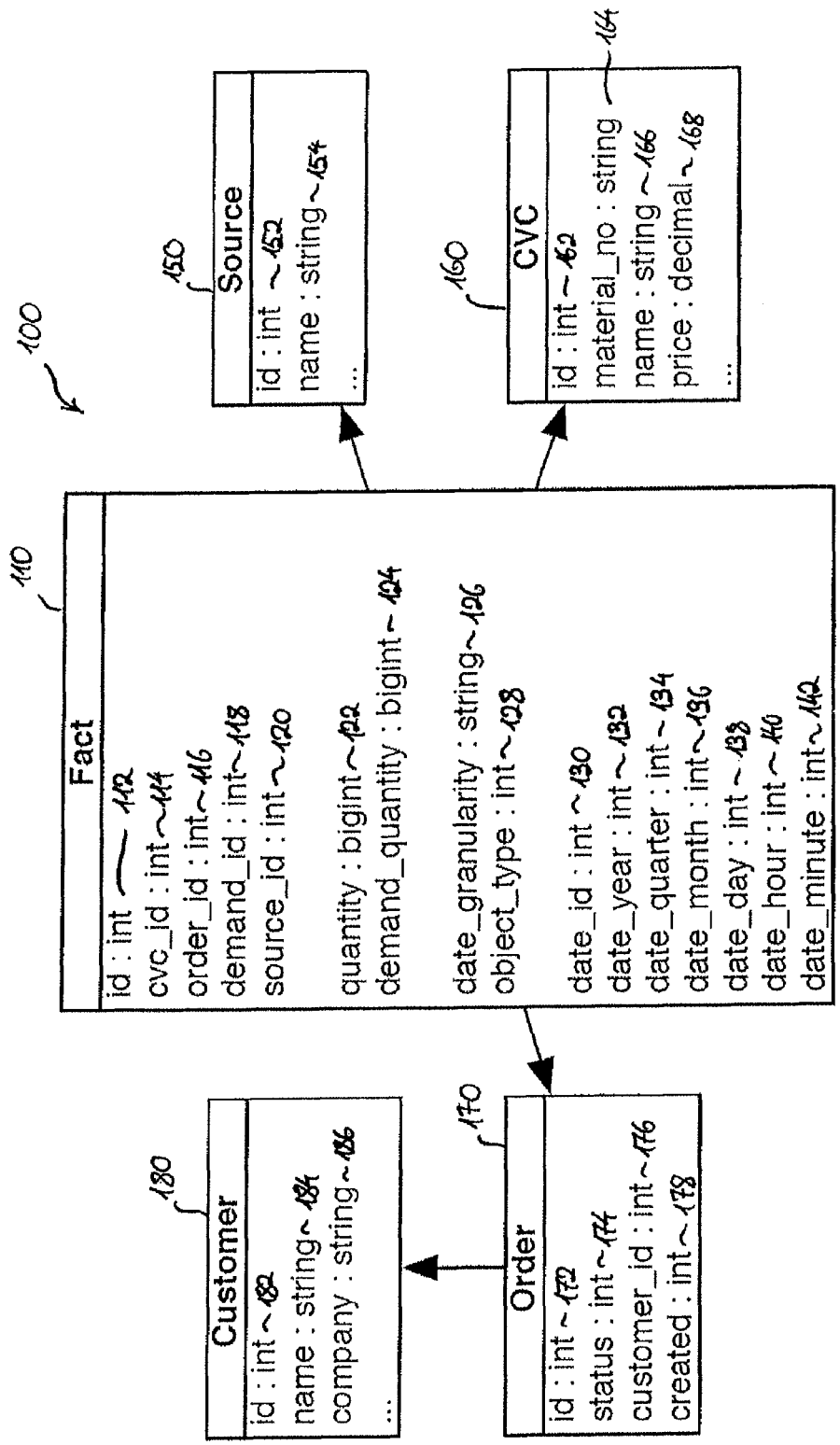
FIG. 1 shows a simplified physical schema as used in an embodiment of the invention.
Figure 2:
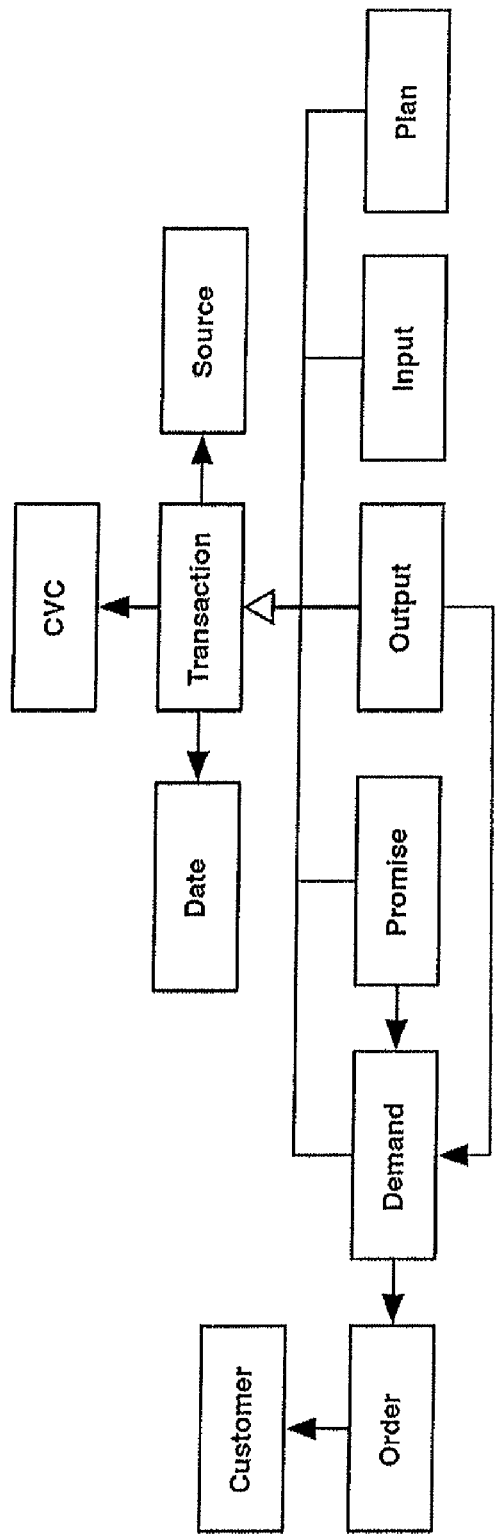
FIG. 2 is a side view of a simplified entity relationship model of an ATP method embodiment of the invention.

A simplified data model underlying the embodiment is set forth in the following. The information relevant to an ATP system is primarily line items representing, e.g., sales orders, customer demands, delivery promises, conducted outputs, the stock level, and planned production inputs. These types of transaction data are consolidated in one table with an object type column for identification, forming the fact table 110 in the star schema 100 [Tim Martyn. Reconsidering Multi-Dimensional schemas. ACM SIGMOD Record, 33(1):83, March 2004]. The simplified physical data model as implemented in the embodiment is shown in FIG. 1. To avoid expensive joins with a potentially large Date dimension table (not shown), this dimension is de-normalized, accepting a certain degree of redundancy. The business objects used in the application are illustrated in FIG. 2.

A star schema classifies the attributes of an event into facts 110 (e.g., measured numeric/time data) and descriptive dimension attributes 150, 160, 170, 180 (e.g., product id, customer name, sale date) that provide the facts with content. The fact table 110 holds metric values recorded for a specific event. The fact table 110 may hold a very large number of entries (billions). Special care is taken to minimize the number and size of attributes in order to constrain the overall fact table 110 size and maintain performance. Dimension tables 150, 160, 170, 180 usually have few entries compared to fact tables 110, but they may have a very large number of attributes that describe the fact data.

Each entry in the fact table 110 is uniquely identifiable by its id 112. An entry in the fact table 110 may be, according to its object_type 128: a demand entry indicating a customer demand for stock items; or a promise entry indicating a promised delivery of stock items; or an input entry indicating input of stock items to the stock; or a stock level entry indicating a quantity of stock items in stock at the date indicated by the stock level entry; or a withdrawal entry indicating a withdrawal of stock items from the stock. An entry in the fact table 110 further indicates how many items of a product leave or enter the stock on a specified date (specified by date_id 130, date_year 132, date_quarter 134, date_month 136, date_day 138, date_hour 140, and date_minute 142). A product is represented in turn by its characteristic value combination (CVC) allowing for unique identification. For this purpose, the cvc_id 114 is stored in the fact table 110 and the features specific for the product, such as material_no 164, name 166, and price 168, are stored in a corresponding CVC dimension table 160. In the fact table 110, there are two quantity columns: quantity 122 and demand_quantity 124 (each column refers to an attribute). This is due to the fact that customer demands indicate what was ordered and do not represent planned stock movements, which are stored in the promises. To be able to provide information about the inventory, only planned and conducted stock movements but not the customer demands have to be summed up. For this reason, the customer demands have a separate quantity column, the demand_quantity 124.

This way, the customer demands do not have to be filtered out when aggregating the stock movements in the quantity column. Recurring data, such as specific orders 170, the customer 180 who ordered the product, and the source 150 of an input—be it a production plant or a supplier—is stored in dimension tables. The fact table entries make reference to the entries of the dimension tables directly (order_id 116, cvc_id 114; and source_id 120) or at least indirectly (customer_id 176 via the order_id 116). An entry of the Source table 150, uniquely identifiable by means of its id 152, may indicate the attribute name 154. An entry of the CVC table 160, uniquely identifiable by means of its id 162, may indicate the attributes: material_no 164, name 166, and price 168. An entry of the Order table 170, uniquely identifiable by means of its id 172, may indicate the attributes: status 174, customer_id 176, and created 178. An entry of the Customer table 180, uniquely identifiable by means of its id 182, may indicate the attributes: name 184 and company 186. Finally, an entry of the fact table further indicates the attribute date_granularity 126.

As a typical feature of a star schema, most columns in the fact table are foreign keys (such as cvc_id 114, order_id 116, demand_id 118, source_id 120, and date_id 130) to dimension tables 150, 160, 170, 180. It can be expected that the content of the majority of dimension tables 150, 160, 170, 180 is static. The entries in the Date dimension table (not shown) will only be updated, when the fiscal year comes to an end and the planning horizon changes. The assumption that the content of the CVC table 160 and Source table 150 is constant is just as reasonable. Changes to these tables are necessary only if the company introduces a new product, if the company puts a production plant into operation, or if goods are purchased from a new supplier. As a consequence, the total volume of data may be reduced by storing recurring information in dimension tables 150, 160, 170, 180.

In Table 1 shown in FIG. 11, an extract 1100 from the fact table 110 is shown. Herein, the redundant date specifications date_year 132 to date_minute 142 as well the columns order_id 116, source_id 120, and date_granularity 126 are left out. Further, only a fraction of four entries are shown. The first row 1101 having the value of five as its id represents a customer demand with the computed delivery promise in the second row 1102. This relation can be seen by the foreign key demand_id, which is set to five in the promise entry 1101 and hence points to the demand row 1102. Besides, object_type equal to three and one identify these rows as demand and promise, respectively. Since they correspond in quantity and date, the request can be fulfilled in time. The third row 1103 is an input entry, as characterized by an object_type equal to two. This input entry 1103 of five hundred items of the same product that was requested by the aforementioned demand entry 1102. Inputs do not refer directly to a customer demand so that they remain as flexible as possible when, for example, an unexpected loss of stock occurs and a redistribution of resources is required. Accordingly, its foreign key demand_id is a null pointer. One might wonder why the quantity is replicated in the column demand_quantity. This way, however, an option of running an ATP check according to the invention against the requested instead of the promised quantities is maintained. Thereby, already booked orders may be favored over new ones. An object_type of four identifies withdrawals from stock made to accomplish a customer order. A promise may be turned into such an output as soon as the items are taken from the warehouse and are on their way to the customer. To provide the connection between demand and outputs, the outputs also store the id of the demand in the dedicated foreign key column. The last row 1104 in Table 1 is an example for an output. The demand it refers to, the fact with an id value of four, is not listed in the extract shown in Table 1.

The core functionality of an ATP application is the determination of earliest possible delivery dates based on the inventory. The available capacities accrue directly from stock, inputs, and previously confirmed orders. In the following, two solutions to this problem addressing the decisive ATP requirements and the characteristics of our embodiment are suggested and evaluated. The two methods are equal in terms of correctness and complexity but differ in performance depending on the underlying architecture and dataset.

ATP Check—Candidate Check

A first method for computing earliest delivery dates is employed by the embodiment of the invention. The first method is called candidate check. The name "candidate check" is derived from the suggested promises (herein referred to as candidates), which are created in the course of the candidate check.

Figure 3:
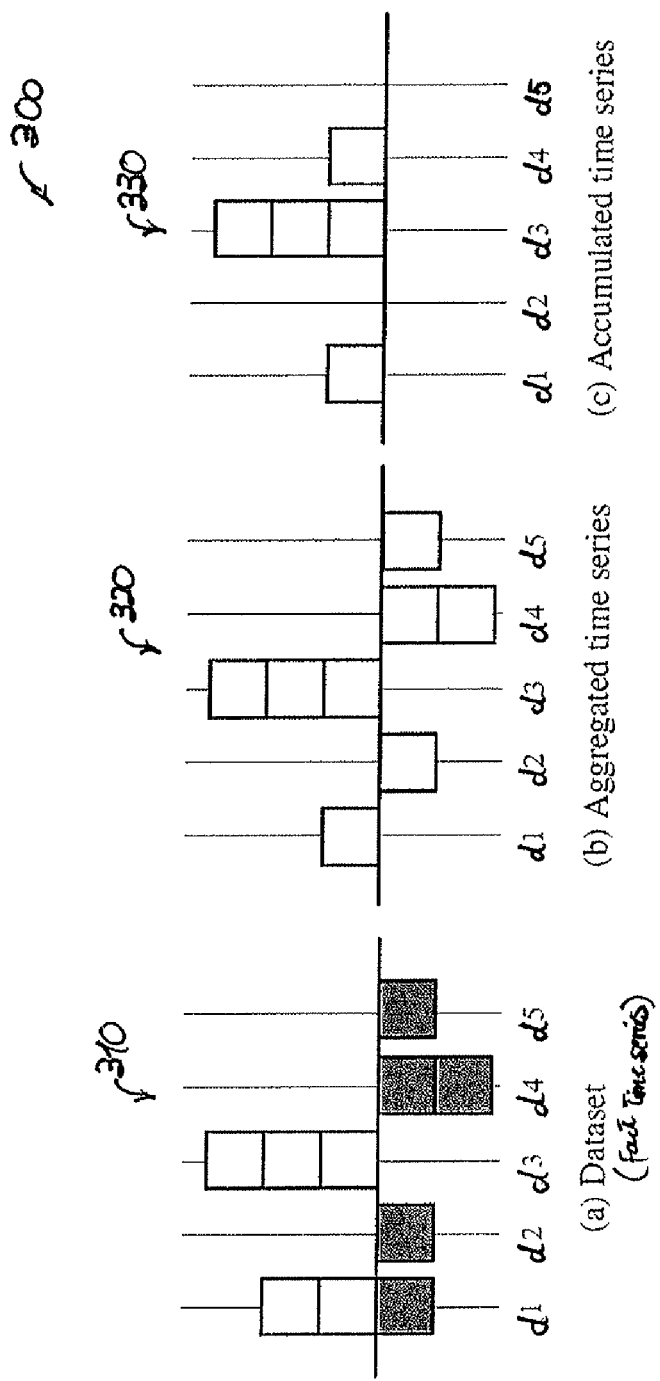
FIG. 3 shows an example of a time series calculation according to an embodiment of the invention.

In the following, the details of the method, particularly the determination of candidates, is explained with reference to FIG. 3. The method operates on a chronological ordered list of dates associated with the aggregated inputs and outputs for the particular dates: the aggregated time series 320.

Preferably, dates with a total aggregated quantity of zero will be omitted to reduce the runtime. Such tuples indicating a date and a quantity are herein referred to as buckets and chronological lists of buckets as time series. Apart from the aggregated time series 320, the method maintains a list of candidate buckets as temporary promises that are also sorted by date in ascending order. As an interim promise, a candidate indicates the quantity that is allocated (also referred to as booked) on the specified date for the current demand. The word temporary is meant to point out that the temporary candidate is potentially deleted or reduced with regard to its allocated quantity while iterating over the remainder of the time series. Those candidates that are retained until the algorithm terminates are written as promises to the database. If there is exactly one candidate with the desired quantity on the desired date, the order will be fulfilled in time.

To identify candidates, the total stock level for each date d1, d2, d3, d4, d5 is required. Therefore, a new data structure, termed accumulated time series 330, is deduced from the fact time series 310.

The entire candidate check method is formally described in Listing 1 shown in FIG. 12. From the very beginning of the planning horizon, all quantities are added up to the desired date (listing 1, line 1 to 9). Reaching that point in the aggregated time series 320, the creation of candidates starts. If the accumulated quantity is positive (listing 1, line 10), the first candidate will be initialized. Generally, the quantity of a candidate is limited to the stock level of the respective date, in this case the desired date (see listing 1, lines 10 and 23). It is logical that the maximum booked quantity of a candidate is the desired quantity (see listing 1, lines 11, 12, and 23). For further processing, the accumulated quantity is reduced by the quantity of the new candidate (listing 1, lines 17 and 22). As long as the desired quantity has not been completely allocated yet (listing 1, lines 11 and 12), candidates are created while processing the time series.

If the stock level falls below zero (listing 1, line 23) due to other promises or a decline in production, the list of candidates has to be corrected (listing 1, lines 24 to 26). For this purpose, the candidate quantities are de-allocated until the stock level is zero again or the list is exhausted. To ensure best possible delivery dates, the list is updated in descending order, removing the latest buckets first. To highlight the essential control flow, the readjustment of the candidate list 460 in case of a negative accumulated quantity is not listed on instruction level but hidden in the method truncate_qty, which is invoked on the candidate list (listing 1, line 26).

Figure 4:
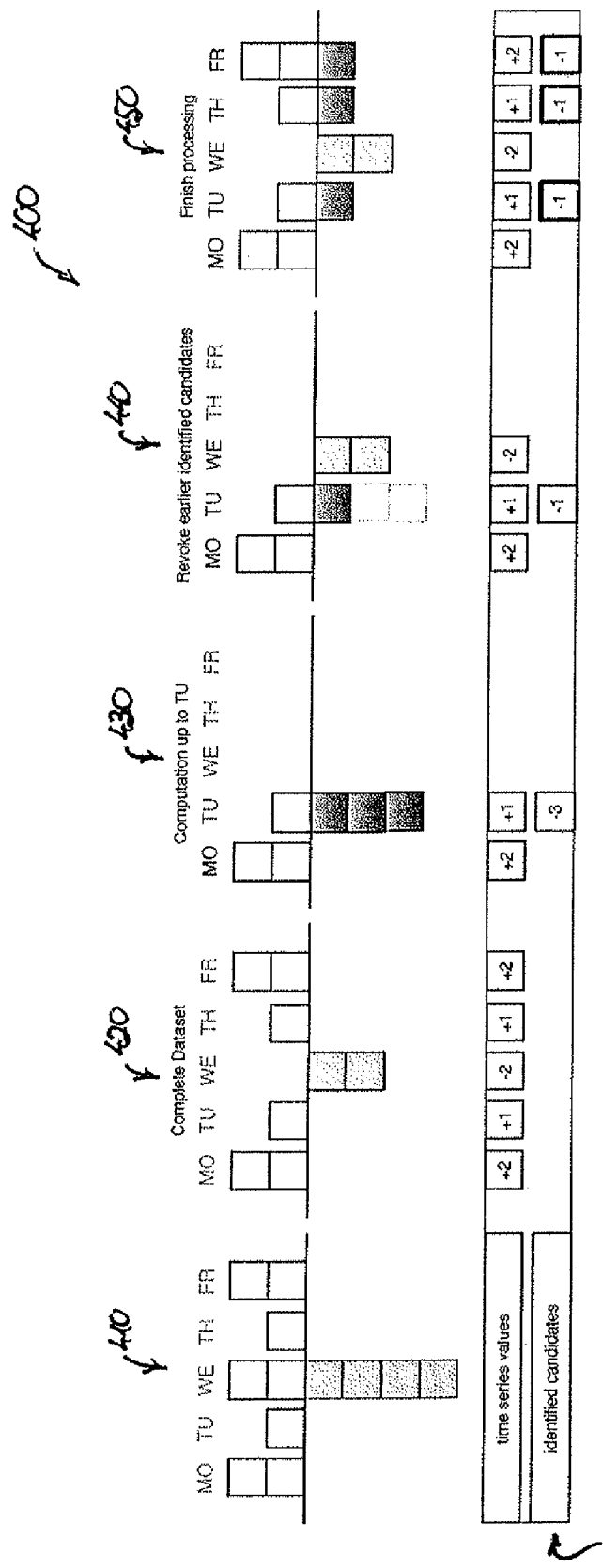
FIG. 4 shows an example of applying a candidate check according to an embodiment of the invention to an example data set.

To improve the understanding of the method, a walk through a concrete example is provided in the following with reference to FIG. 4. The first diagram 410 (from the left) of FIG. 4 shows an example fact time series derived from an example fact table 110, the fact time series 410 indicating stock input and (one) output for five days Mo, Tu, We, Th, Fr. Said fact time series and a new customer demand for three items for Tuesday is the starting point for this walk-through.

The second diagram 420 (from the left) of FIG. 4 shows the aggregated time series with a negative bucket on Wednesday. This may initially be confusing, as it appears to be an overbooking. On the contrary, it is not an overbooking, which becomes obvious when calculating the accumulated time series: inputs on Monday and Tuesday compensate the outputs on Wednesday.

The third diagram 430 (from the left) of FIG. 4 shows how the candidate check method builds up an accumulated time series up to Tuesday. This is in compliance with what was already discussed above and what is reflected in Line 8 in Listing 1 (FIG. 12): the creation of candidates starts at the desired date, which is Tuesday in this example. The accumulated quantity, which results from the Monday and the Tuesday bucket, is three corresponding to the desired quantity. In compliance with Lines 15 to 17 in Listing 1, a candidate for Tuesday with three items is appended to a still empty candidate list; the already booked quantity is set equal to three; and the accumulated quantity is set equal to zero.

On Wednesday, however, two items leave the stock due to the output as already shown in the aggregated time series (second diagram from the left); consequently, the accumulated quantity drops below zero. To compensate the overbooking, two items have to be "given back". For this purpose, the candidate list 460 is processed backwards in time. Since there is only one candidate indicating three booked items, this candidate is truncated so that it indicates only one booked item (see fourth diagram 440 from the left of FIG. 4); the booked quantity is reduced accordingly. Proceeding accordingly, a candidate for Thursday with one item and a candidate for Friday covering the last pending item will iteratively be appended to the candidate list 460. At the end of the planning horizon, on Friday, (see fifth diagram 450 from the left of FIG. 4) the accumulated quantity representing the stock level is still positive so that the three candidates are returned as promises.

Accordingly, a candidate is either created or existing candidates are removed for each date. Therefore, the candidate check method features linear complexity. It is further apparent that this algorithm performs best in case of sufficient stock because only one candidate is created and no updates are required.

ATP Check—Net Time Series Check

Figure 5:
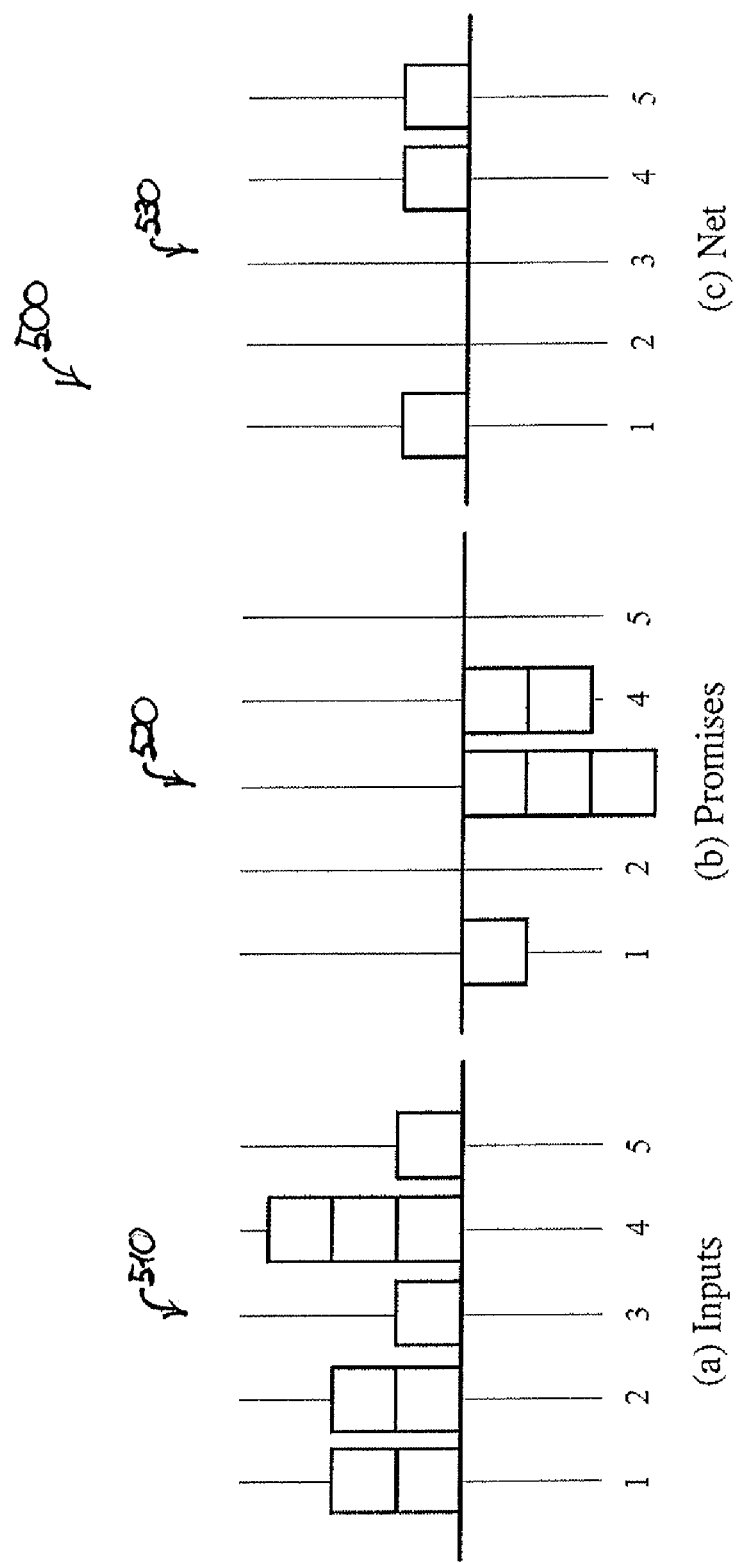
FIG. 5 shows an example of a net time series aggregates.

As stated above, there is a second approach, the net time series check method, leading to the same promises and showing the same complexity. Since this algorithm was not integrated into the embodiment for technological reasons, only the main idea will be outlined with reference to FIG. 5.

The starting point for the net time series check are two time series, aggregating disjoint sets of fact table entries. One time series adds up the inputs 510 and the other one all confirmed and conducted promises 520. In a next step, bucket by bucket, the aggregated promises 520 are matched to the quantities of the input time series 510. A bucket from the promise time series 520 consumes primarily items from the input bucket of the same date. If this corresponding input bucket does not satisfy the promise bucket, first earlier input buckets and after that later ones will be emptied. The resulting net time series 530 represents the resources that are available at the time of the ATP check, and gives this method its name. When the net time series 530 is set up, the new demand acts just like the promise buckets and takes out the requested quantity from the net time series 530. Depending on the obtained input buckets, promises are created.

Whereas the candidate check has to consider the whole planning horizon independent on the stock level, the net time series check can under certain conditions reach minimal computing times. If there are no promises or if they all fall into a small number of buckets and sufficient inventory is available, the method only has to match a few buckets. Under the premise that they can even be fulfilled out of the preferred input buckets, only a fixed number of operations, which is determined by the number of promise buckets, is required and a constant complexity is reached. In such scenarios, the net time series check outperforms the candidate algorithm. This scenario is unlikely in production though because it requires all confirmed promises to fall onto a few condensed dates.

Comparison ATP Checks

In conclusion, the two presented methods deliver optimal promises to the customer and both vary in performance depending on the characteristics of the dataset. Taking technological aspects into account, major differences can be identified.

The above descriptions start with a fact and aggregated time series already available. The creation of these data structures has not been treated so far. In fact, it is the most time consuming part in the overall ATP check because the raw data has to be aggregated on-the-fly. To set up the time series for the candidate check, all inputs and promises of the specific product are added up grouped by the selected time granularity. The resulting database query for the granularity level of a single day is shown in Listing 2 (FIG. 13). The maximum of all dates per bucket is selected because several timestamps may belong into one aggregation class—depending on the granularity. It is necessary to find the latest timestamp of all aggregated records to make sure that at this point in time all movements have already been issued.

For the net time series check, the situation is more complicated. Two separated time series are necessary, which can basically be achieved in two different ways. The first option would be to add an additional group-by attribute, the object-type respectively, to the query for the candidate check. The downside of this method lies in the structure of the result set, which includes the buckets for both time series. Thus, new empty time series are created and while iterating over the result set the buckets are inserted either into the input or the promise time series. Furthermore, with an increasing number of group-by attributes the query execution time increases substantially. Alternatively, the two time series can be extracted from the database in separate queries by adding another predicate for the object type. This approach obviously requires two full table scans and thus does not present a feasible solution, especially when the application has to deal with several millions of records. Another disadvantage, which applies to both query variants equally, is the quantity of data to be transferred from the database to the application layer, as inputs and promises are not consolidated into one time series.

Being aware of the disadvantages of the net time series check with respect to the database queries, deciding in favor of the candidate check appears even more advantageous.

Concurrency Control

The above discussion focuses on the execution of a single instance ATP check in isolation and does not factor in the difficulties caused by multiple parallel instances of the ATP check referring to the same product and consequently accessing the same data (fact table 110). However, managing concurrent processes belongs to the main challenges in parallel environments. Particularly in an ATP system, data correctness and consistency at any time is an essential requirement to avoid incorrect query results (promises). Problems particularly results from a temporal gap that ranges from reading current stock levels from the database to finally writing a promise based on those results. Within this temporal gap, a second request operating on the same inventory (and fact table 110) may have calculated a delivery date and booked resources that are necessary to fulfill the first request. As a consequence, the same products are promised twice producing an inconsistent state in the database. Such anomalies are a serious problem in an ATP system. A company might take severe damage from dealing with the resulting effects including upset customers, contractual penalties, costs for acquiring substitute products, and/or the like. In current ATP systems, common practice is serializing the execution of concurrent requests by locks. Our embodiment allows for choosing out of three strategies suitable for different situation. These three approaches will be elaborated and benchmarking results will be presented in the following.

Exclusive Lock

The first approach relates to a naive but secure way to preserve consistency constraints: exclusively locking critical data as already discussed above. In this context, exclusive locking involves granting one ATP process (also referred to as instance) exclusive access rights to the entire set of fact table entries for the desired product. Since the whole planning horizon has always to be checked, simultaneous checks on different dates are unfeasible. The first incoming ATP process (the first ATP instance) engages the lock, queries the database, calculates the delivery dates, writes the promises back to the database, and finally releases the lock for the next ATP process (ATP instance) to start. It is needless to say that this locking policy, termed exclusive lock, involves unnecessary latencies in case of sufficient stock. If there are several hundreds of incoming requests for one product per minute, these unnecessary latencies resulting from a sequential schedule lead to response times that exceed the limit of tolerance.

Optimistic Mechanism

The second approach—the optimistic mechanism—enables parallel execution without blocking, whereas the exclusive lock queues incoming requests for the same product. The term "optimistic" expresses the nature of this strategy that presumes a balanced stock situation. In theory, the optimistic mechanism allows for as many parallel requests as cores available and therefore scales linearly with hardware resources. However, the gain in scalability depends on a certain staleness of the fact table data. Even if the fact table data exhibits according characteristics, without modification of the ATP check, violations against the consistency of the fact table data may occur.

A modification according to the optimistic mechanism involves implementation of a consistency check that is performed subsequent to the candidate check as outlined above. Thereby, the correctness of the result is verified in view of the new stock level.

First, for the purpose of avoiding a second full table scan (apart from the candidate check full table scan), the maximum row id 112 of the fact table 110 identifying the most recently written record is retrieved from the database in advance.

Then, the candidate check is performed based on the stock level up to this id 112. It must be mentioned that the row id 112 is a continuously incrementing counter, which facilitates absolute ordering of fact table entries by insertion time. If the candidate check results in a complete or at least in a partial delivery, the according promises are written to the database (fact table) and the consistency check is executed.

Thereby, all fact entries with an id 112 higher than the initially determined maximum id 112 are retrieved. The resulting set contains exactly those entries (e.g., inputs and promises) that were recorded during the candidate check. These entries are successively included into the candidate check time series that comprises the entries up to the maximum id 112. If the entry is an output (for instance, a correction to planned inputs or a promise), the stock is checked for overbooking and the invalid quantity (i.e., the overbooked/negative stock quantity) is saved. If the entry is a promise related to the current demand, the system will use the booked quantity indicated by the promise to compensate the overbooked quantity. Accordingly, the promise will be either deleted or reduced. When all records are processed, a new ATP check (including a candidate check and an optimistic mechanism concurrency control) will be triggered, the ATP check relating to the total rebooked quantity. Evidently, this conflict resolution procedure can end up in an infinite loop. In order to enforce a termination, a maximum recursion depth may be defined. Once the ATP check has reached this maximum recursion depth, the ATP check switches from the optimistic mechanism to the exclusive lock.

To sum up, the optimistic mechanism dispenses with exclusive locks unless the inventory is close to exhaustion and many parallel requests are competing for the last items. Though, as long as sufficient capacities are available, the avoidance of locks can be fully leveraged by the optimistic mechanism—in particular if appropriate hardware resources are provided.

Instant Reservation

The third approach arises from the drawbacks of the two aforementioned approaches. In general terms, it works similarly to the optimistic mechanism without the need for conflict resolution. The key to this enhancement lies in blocking the desired quantity before the candidate check is started. This approach is accordingly called instant reservation.

To reserve the requested quantity, a promise complying with the customer demand is written directly to the database (fact table 110). For the candidate check, the fact entries up to this promise are aggregated so that the candidate check will not be affected by its own reservation.

Once the result is computed, it is compared to the initially recorded promise. If they do not correspond to each other, an adjustment follows. At this point, it must be mentioned that this process is totally transparent to the user of the system. The reservation promise will not be passed on to the user, unless it corresponds to the one determined by means of the candidate check. Otherwise, the updated promises will be delivered.

Reviewing the sequence of steps, one might have noticed that the reservation can cause an overbooking. But through the comparison in the end, each ATP check clears up self-inflicted inconsistencies. Concurrent processes include earlier reservations in their calculations. Accordingly, it is guaranteed that they do not allocate resources needed to fulfill other earlier processes. Even if the earlier processes have not finished their candidate check yet, the desired quantities are blocked by the reservation.

However, in one specific case, this approach does not produce an optimal utilization of available resources. Given an empty stock and two incoming requests with the same quantity, the first one writes its reservation and initiates the aggregation excluding the reservation. Before the second request writes the reservation promise, an input is recorded with exactly the same quantity like the demands. This input is not seen by the first process so that the request will be rejected.

Therefore, it would be desirable that the input will be used to satisfy the second process. This process, however, includes both, the input and the reservation of the first process. Thus, it also faces an empty stock and refuses the customer request. Being aware of this problem, one has to decide, whether one accepts it and receives the benefits arising from the renouncement of locks as well as conflict resolution. More detailed information about the performance of all three mechanisms will be provided in the following.

Prototypical Implementation and Benchmarking

As abovementioned, the presented embodiment has been designed in the context of a joint research project between the Hasso Plattner Institute and SAP. The used database system is based on proprietary SAP DBMS technology and is referred to as relational, column-oriented, in-memory DBMS in the remainder of this application. Our ATP embodiment had to tackle the following architectural requirements: Multiple concurrent orders have to be possible and are to be handled without risking inconsistency. The embodiment eliminates static buckets limitation in current ATP systems and thereby enables adjustable delivery date granularity on a per-demand basis. The embodiment is optimized for columnar, in-memory storage [Doug Henschen. SAP Announces In-Memory Analysis Technology, 2010]. In order to provide fast order confirmation, our implementation also exploits parallel execution potential within the concurrency control strategies. It provides special views for analytical queries, which allowed us to specify key figures upfront, yielding improved performance in analytical queries, particularly those important to create the time series for a candidate check. The application logic is implemented in Python, accessing the database with via its SQL interface. Computationally intensive parts have been ported to C++ and are imported as compiled modules.

Benchmarks

The benchmarks were conducted on a 24 core Xeon-based server (four physical cores each comprising six logical cores) with 256 GB of main memory. This server was used for both application and database, eliminating network performance as a factor in accessing the database. Furthermore, in our benchmarks we disabled logging of transactions to prevent hard disk transfer speed from posing as a bottleneck in our scenarios.

Our benchmarks were conducted on a dataset that was derived from an existing ATP system of a Fortune 500 company. Today's ATP systems do not support analytics on top of ATP checks and only keep a short horizon of data as an active dataset and discard data after a few days. Thus, we generated a dataset spanning 3 years from a set of records covering 3 months of planning horizon.

We ran our benchmarks on datasets ranging from 1 to 64 million active transaction items, where every order has 5 to 15 line items. Other dimensions were not scaled with the number of transactions, simulating different company sizes. The immediate goal of our benchmarks is to show the feasibility of our embodiment and proposed data structures. The exclusive lock approach provides a comparison with existing systems from an algorithmic standpoint—it reflects how checks in modern ATP systems are conducted with the only difference being the data storage.

Dataset Size

The first benchmark serves as a proof of concept of the database architecture applied in our system. On a varying dataset size, the same operations are performed. In each run, 10 concurrent processes execute 400 ATP checks. The critical part concerning the overall runtime of an ATP check is the aggregation query. The time spent in the application or to be exact the candidate check is supposed not to be affected by the dataset presuming a constant distribution of fact entries over the time. In this case, the size of the time series is determined only by the chosen granularity, which will not be changed so that the application part is constant.

Figure 6:
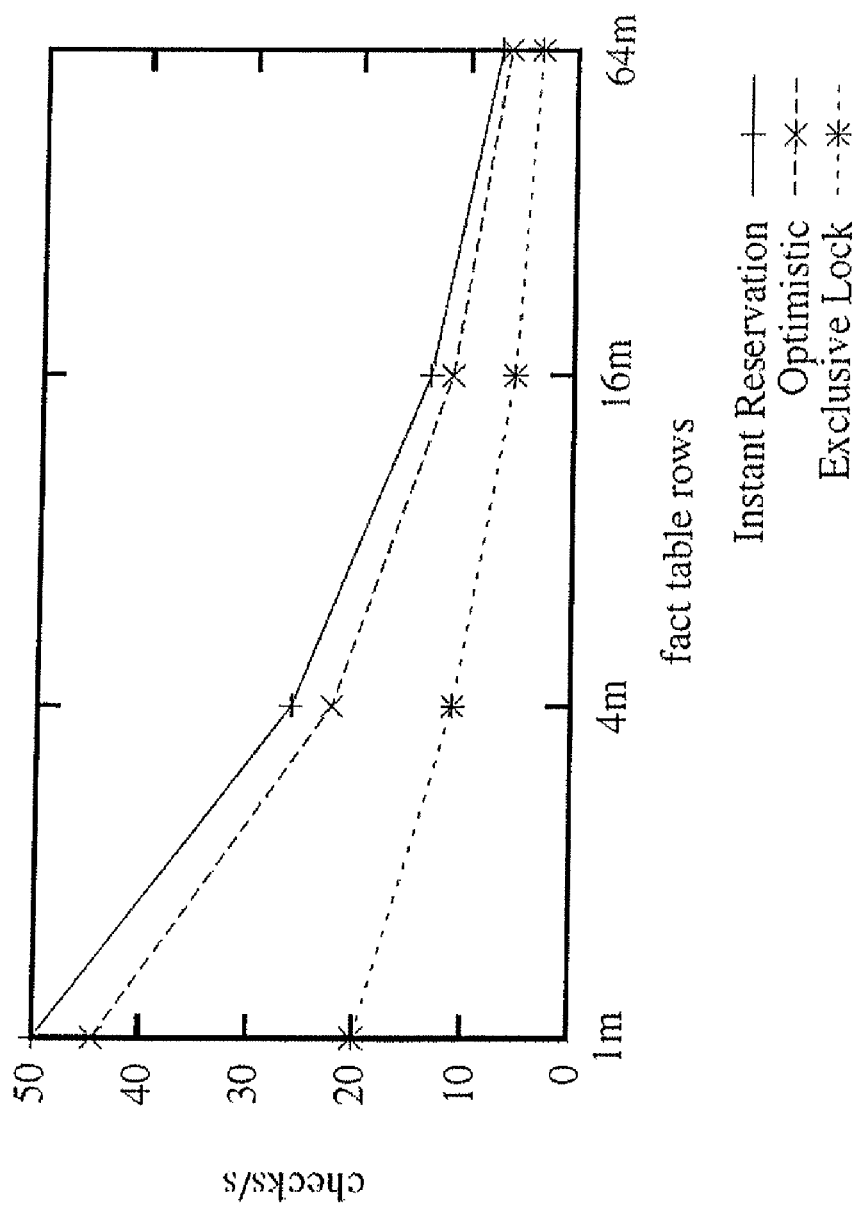
FIG. 6 shows benchmark results of varying dataset size for embodiments of different concurrency control methods.

The expected outcome of this benchmark is a linear relation between the dataset size and the query execution performance. FIG. 6 displaying the throughput of checks explicitly reflects this trend. For the remaining experiments in this patent application we work on 64 million records item which represents three years of operations in a large company.

Concurrency Control—Single Check

The following experiments directly compare the three concurrency control mechanisms introduced above. For this purpose, at first a single check is executed in isolation to evaluate the overhead added by the concurrency control.

To recapitulate, the exclusive lock only wraps the candidate check with the acquiring and releasing of a lock on product level. Both are atomic operations and do not involve database access. The overhead is supposed to be negligible. In contrast, the optimistic approach requires a consistency check, which might induce a loop of conflict resolutions, the loop having a maximum recursion depth. The instant reservation mechanism neither uses locking nor consistency checks. Instead, it writes the promise first and has to validate it in the end. In case of a mismatch with the calculated delivery confirmation, an additional write operation to correct the promise is triggered.

Figure 7:
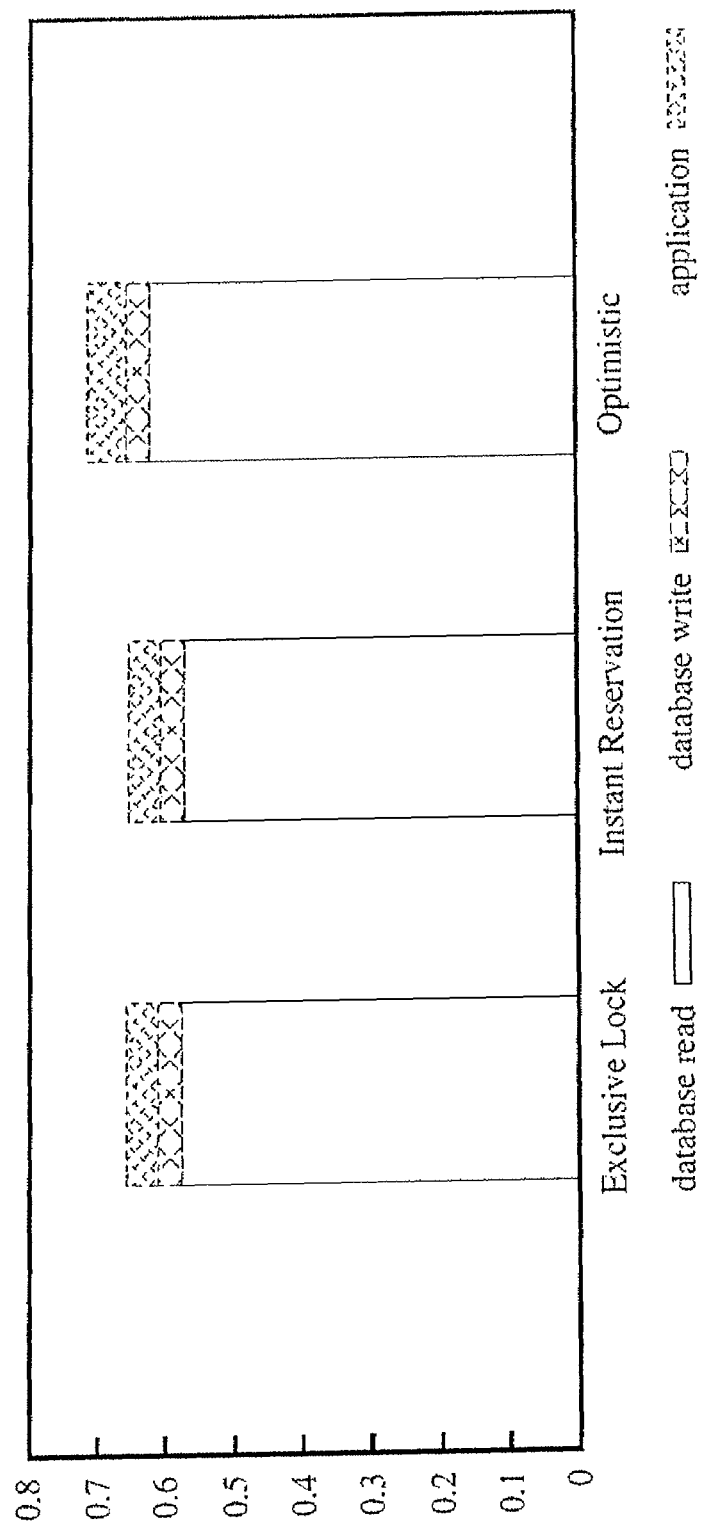
FIG. 7 shows benchmark results of a single ATP check for embodiments of different concurrency control methods.

In FIG. 7, the elapsed time split into read, write, and computation is illustrated. As expected, the optimistic check performs worst in this experiment because it has to retrieve the recent fact entries to control the stock level after booking.

Since the inventory has not changed during the check and enough items were available, a conflict resolution has not happened. Neither a promise adjustment in the instant reservation run was necessary. Hence, the overhead is minimal for the two strategies that dispense with locking. The process of the exclusive lock is independent on the scenario and does not prolong the check anyway. Nevertheless, the scenario was not constructed to show the best case performance of the any strategy but rather to emulate the most common conditions with sufficient stock.

Concurrency Control—Throughput

After comparing single check times, the effectiveness of the presented techniques when facing parallel requests is measured. The most typical key performance indicator for assessing concurrency control strategies is throughput, which in our case is the number of accomplished ATP checks per second. The setup for this experiment consists of 1000 ATP checks to be executed on the machine specified above by a varying number of processes representing the degree of parallelization. In the first experiment, the ATP checks refer to different products.

Figure 8:
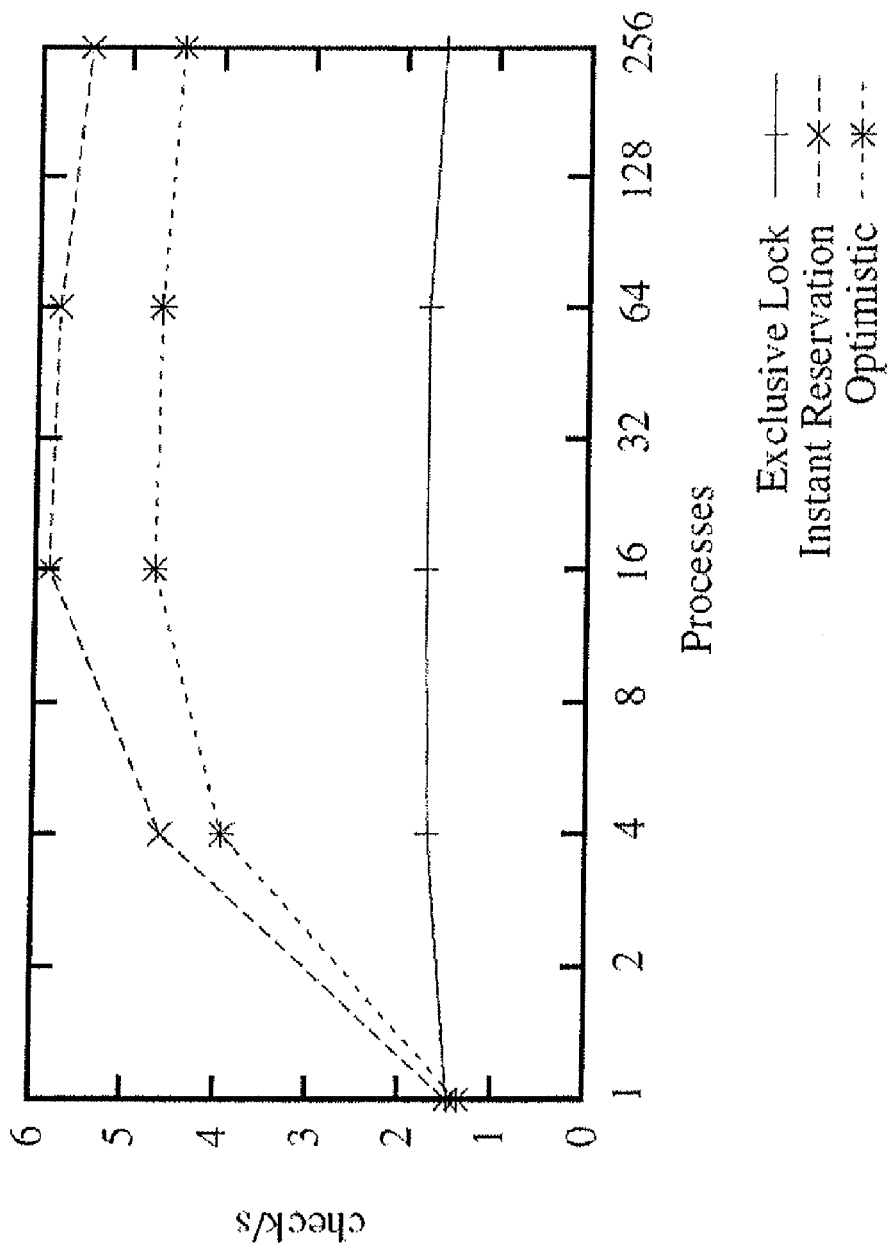
FIG. 8 shows benchmark results of a single CVC access for embodiments of different concurrency control methods.

On the basis of the single check times and the hardware capacities, conclusions about the throughput can easily be drawn. The exclusive lock allows parallel requests on different products; so do the optimistic and the instant reservation approaches. Logically, the throughput scales linearly with an increasing number of processes. Since there is only a limited number of physical and logical cores, the increase of the curves flattens when the hardware is fully exploited, as can be seen in FIG. 8.

Figure 9:
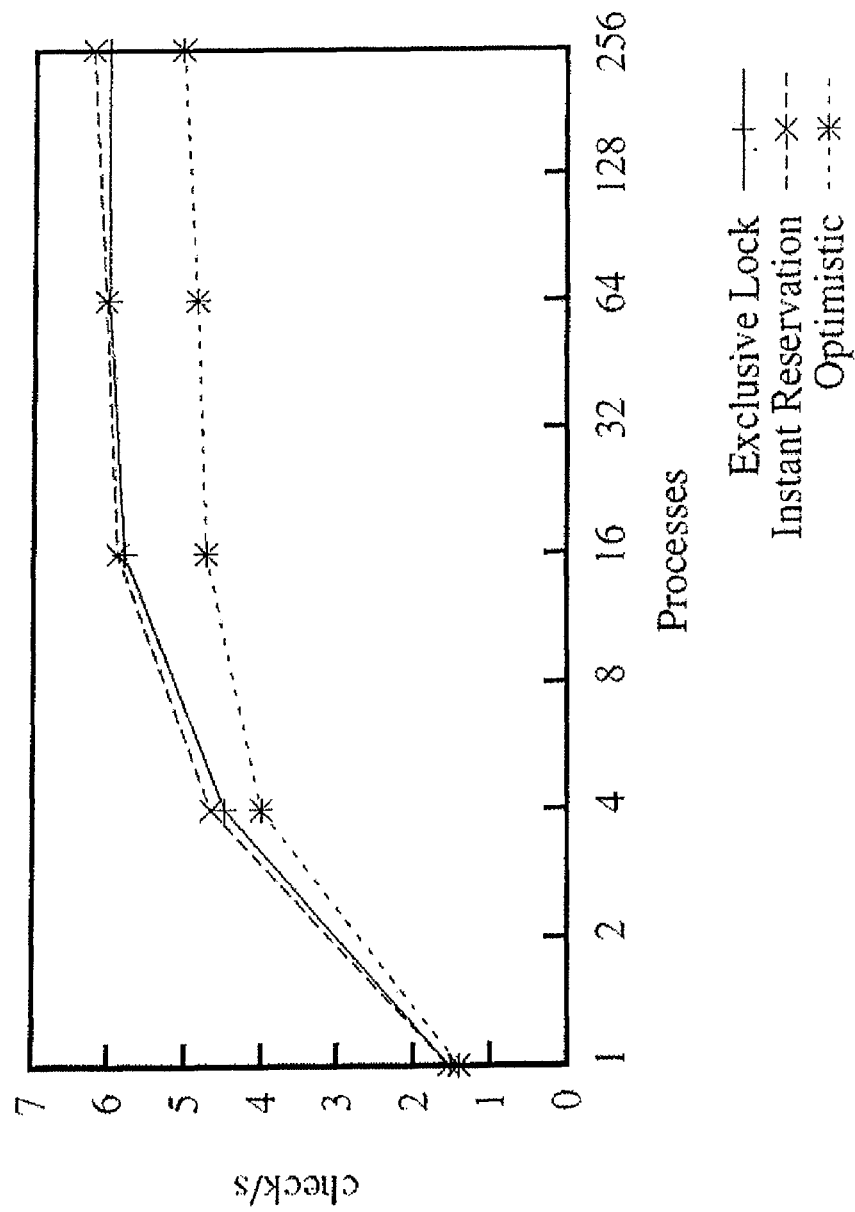
FIG. 9 shows benchmark results of disjoint CVC access for embodiments of different concurrency control methods.

For concurrent ATP checks on one single product, another behavior is assumed. No matter how 25 many processes are used to carry out the 1000 ATP checks, only one process at a time can operate on the requested product in case of the exclusive lock. The logical consequence would be a constant throughput, which could be verified experimentally in our measurements, cf. FIG. 9. This benchmark further gives evidence for the scalability of the two other alternatives in case of concurrent checks on one product. Those scenarios heavily benefit from locking-free concurrency control, whereas the exclusive lock enforces a sequential execution.

Write-Intensive Operations

Column-stores are particularly tailored for analytical queries. The workload of an ATP application is not limited to availability requests only but includes regular write operations as well. New orders and delivery promises have to be saved with every order. All new inputs and changes in inventory and production result in update and insert operations. The prevailing solution to handle a mixed workload consists of the division of the database into two parts, a read-optimized and a write-optimized store, the delta store, as briefly discussed above. The read-optimized store contains a snapshot of the database at a pre-established point in time. All incoming modifications are written to the delta store [V. J. Kollias, M. Hatzopoulos, and J. G. Kollias. Database maintenance efficiency using differential files. Information Systems, 5(4):319-321, 1980]. The idea of organizing the data in two isolated stores dates back to the Sixties.

Early studies propose to regularly consolidate all modifications in the write-optimized store into the read-optimized store [Dennis G. Severance and Guy M. Lohman. Differential files: their application to the maintenance of large databases. ACM Transactions on Database Systems (TODS), 1(3):256-267, 1976]. This so called merge process is the only procedure that modifies the read-optimized store. Since there is no need for maintainability or updatability, it can store the data most suitable for fast read access.

Figure 10:
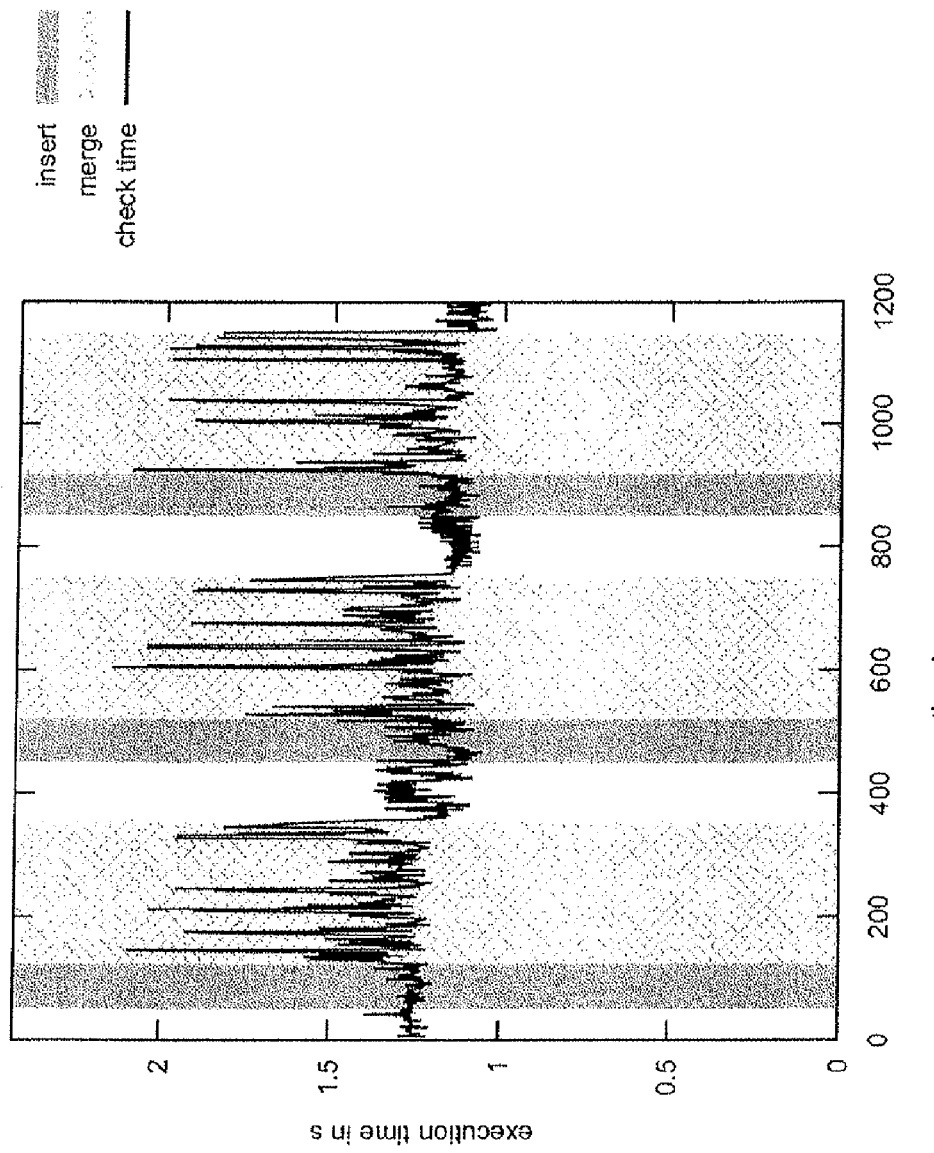
FIG. 10 shows benchmark results of performance during merge for an embodiment of the invention.

In the delta-store, fast inserts can be enabled by not using the compression and keeping the data unsorted. The obvious effect is that ATP checks slow down, when the delta store reaches a certain size because both stores need to be considered. In the light of this performance loss, a naive suggestion would be an eager merge policy minimizing the response times of analytical queries. However, the merge process itself is a complex procedure consuming a considerable amount of system resources. So, merge scheduling strategies have to deal with the tradeoff between merging often to keep the write-optimized store small and merging rarely to reduce the influence of the merge on the regular operation. To get an impression on how the merge process affects the ATP check execution, a long-term benchmark has been run on a dataset of 64 million records. One process continuously executes ATP checks and another one inserts in cycles 1000 fact entries that are merged instantly to the read-optimized store. The curve in FIG. 10 shows the total time spent on one ATP check while the second process is in insert, merge, and idle phases and highlights the importance of a smart merge policy.

Business Implications

After describing the involved concepts and their prototypical implementation, this section lists possible business implications that could be realized by running the ATP application in a productive environment.

Parallel ATP Checks on Hot Products. Performing ATP checks on aggregates necessitates exclusive locking. As demonstrated in the previous section, we can omit exclusive locks in our embodiment. This increases the throughput of different, simultaneous checks on the same product by using multi-core technology and parallel computing. The limits of performing simultaneous checks on a single products is a problem, e.g. for high-tech companies when they introduce new, highly requested products.

Changing the Temporal Granularity for Every ATP Check. Since for every check the corresponding time stamp is saved, it is possible to change the temporal granularity for every single ATP check. Consequently, if necessary, a check on hours or on weeks can be done in the same system without any modifications. This is not possible with aggregates as they can only operate on one initially defined temporal granularity.

Considering Product Attributes in the ATP Check. The inclusion of additional attributes during the ATP check is supported by the columnar data structure and has a significant business impact. Now, companies are able to include fine-grain product attributes in their ATP checks for otherwise identical products without setting up an entire new ATP system. Examples are the date of expiry in the food industry or the quality of raw materials, e.g. in the steel industry.

Analytics on ATP Check History. The ability to do analytics on the history of ATP checks introduces two major advantages: on the one hand, a company can perform classical analytical tasks such as seeing which products were sold the most, which customer groups ordered which kinds of products in which time periods and the like. On the other hand, storing the complete history of ATP checks also including those ATP checks that have not resulted in actual orders provides an important source of statistical information: companies may identify products that have been highly requested but were not ordered, e.g., because not enough quantities were available. Furthermore, a company may identify the most popular replacement products, e.g., which products were ordered in the end, although different products were initially included in the ATP check.

Instant Order Rescheduling. Promised orders and planned deliveries are based on a certain schedule of incoming products or planned production. However, these schedules and plans often turn out to be incorrect as products may not arrive on time or production goals can not be met. As a consequence, already promised orders have to be rescheduled. Using aggregates, this is a time-intensive process: the relevant aggregates have to be back calculated to the point where the order in question was promised so that the new delivery date can be calculated considering the delayed production. This operation can now be done significantly faster as all the relevant, fine granular data is at hand. Here, including different attributes is of interest again because, for example, an existing customer who is about to place a new, high-volume order should obtain all orders promised to him on time—even if the quantities of available products are lower than expected.

Benchmark Conclusion

The real-time ATP approach presented in this patent application does not only tackle performance bottlenecks but also enables innovative features.

First, on the technical side, the applicant invented an ATP method, the method comprising a candidate checking method. A preferred embodiment of this ATP method employs the instant reservation strategy as a preferred concurrency control mechanism for executing an ATP check on an in-memory column-store database. The performance of this preferred embodiment was analyzed with regard to an example dataset of a fortune 500 consumer products company. The dataset relates to about 64 million events (per year) relating to goods entering or leaving its stock and therefore consists of about 64 million transactional items. In a realistic business situation, approximately 300 ATP checks are called up every minute. The preferred embodiment achieved a check time of only 0.6 milliseconds on this dataset; consequently, more than 1600 ATP checks may be executed per second. Thereby, the performance of the preferred embodiment scaled linearly with added CPU cores, even in situations wherein many more than usual ATP checks for the same product are executed at the same time. Accordingly, from a technical performance perspective, the preferred embodiment is undoubtedly capable of handling such realistic situations and even significantly exceeds the performance requirements.

Further, the preferred embodiment encompasses multiple further advantages and advantageous technical effects, distinguishing it over the prior art. On the business side, the applicant has described above possible business implications of the preferred embodiment. For example, due to limitations of many existing systems, only very few companies track availability checks that did not result in orders. Consequently, other companies loose extremely valuable statistical information for planning purposes. Furthermore, in the prior art, rescheduling of orders is a time-intense, static process without the possibility to include further requirements. These two problems associated with existing systems are solved by the preferred embodiment and by themselves already provide a significant benefit for companies.

The outlook of this application leaves the safe harbor of well-established database concepts, prototypical implementations, and measurable results and draws a vision how companies could leverage analytical capabilities in the context of an ATP check in order to maximize their profits. On the one hand, let us assume that one can analyze the full history of a customer's ATP checks and resulting orders during every newly incoming ATP check. That would implicate that one can calculate the probability that a customer still places his order even if he cannot get the products delivered on his initially requested date. Therefore, one can derive certain flexibility on the companies' side when to produce and ship an order without actually loosing any orders. On the other hand, the applicant heavily discussed the consideration of additional attributes during the check throughout the application at hand. Another example for such an attribute could be the varying production costs for the different products over time. Even if companies sell products for the same price over a certain period of time, the real production costs vary heavily due to changing raw material costs, different availability and costs of labor, and changing component suppliers. Putting the pieces together, instead of just considering the available quantities during the check, a company could also include varying production costs and therefore present an availability date that aims at maximizing the profits by shifting orders to periods of low production costs.

Example Machine

In the following, a machine in the example form of a system within which a set of instructions, for causing the machine to perform any one or more of the methodologies discussed herein, may be executed. The systems for running a computer (e.g., a database management system), a client, a server, and a database may be an according machine. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment. The machine may be a personal computer (PC), a point of sale terminal, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system includes a processor (e.g., a central processing unit (CPU), a graphics processing unit (GPU) or both), a main memory and a static memory, which communicate with each other via a bus. The computer system may further include a video display unit (e.g., a liquid crystal display (LCD) or a cathode ray tube (CRT)). The computer system also includes an alphanumeric input device (e.g., a keyboard), a user interface (UI) navigation device (e.g., a mouse), a disk drive unit, a signal generation device (e.g., a speaker) and a network interface device.

The disk drive unit includes a machine-readable medium on which is stored one or more sets of instructions and data structures (e.g., software) embodying or utilized by any one or more of the methodologies or functions described herein. The software may also reside, completely or at least partially, within the main memory and/or within the processor during execution thereof by the computer system, the main memory and the processor also constituting non-transitory machine-readable media.

The software may further be transmitted or received over a network via the network interface device utilizing any one of a number of well-known transfer protocols (e.g., HTTP) and embodied as a transitory transmission medium (e.g., a carrier wave signal).

While the machine-readable medium may be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media. Example embodiments may be implemented in digital electronic circuitry, or in computer hardware, firmware, software, or in combinations of them. Example embodiments may be implemented as a computer program product, e.g., a computer program tangibly embodied in an information carrier, e.g., in a machine readable storage device (non-transitory) or in a propagated signal (transitory), for execution by, or to control the operation of, data processing apparatus, e.g., a programmable processor, a computer, or multiple computers.

Instructions constituting a computer program can be written in any form of programming language, including compiled or interpreted languages, and may be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Non-transitory information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Certain applications or processes are described herein as including a number of components, modules or mechanisms. A component, module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may include hardware circuitry, optical components, single or multi-processor circuits, memory circuits, software program modules and objects, firmware, and combinations thereof, as appropriate for particular implementations of various embodiments.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of determining an earliest delivery date for a demand, the method comprising:
storing a fact table in a database connected to the computer, wherein a fact time series is comprised by the fact table and comprises fact tuples indicating both a fact date and a change in quantity of items in a stock that occurred on the corresponding fact date, and wherein the demand indicates both a desired date and a desired quantity for items from the stock; and
determining the earliest delivery date for a demand on the basis of the fact time series,
characterized in that
no materialized aggregates are employed for determining the earliest delivery date.

2. A computer-implemented method of determining an earliest delivery date for a demand, the method comprising:
storing a fact table in a database connected to the computer, wherein a fact time series is comprised by the fact table and comprises fact tuples indicating both a fact date and a change in quantity of items in a stock that occurred on the corresponding fact date, and wherein the demand indicates both a desired date and a desired quantity for items from the stock; and
determining the earliest delivery date for a demand on the basis of the fact time series,
characterized in that,
the determining includes:
  (a) generating an aggregated time series from the fact table by:
    (a1) at least one of defining and obtaining discrete time intervals;
    (a2) generating, for at least one discrete time interval, an aggregated tuple indicating both its corresponding discrete time interval and the aggregated change in quantity of items in the stock that occurred in its corresponding discrete time interval; and
  (b) generating a candidate list by traversing the aggregated time series forwards in time and thereby generating, for each discrete time interval, none or one candidate tuple indicating its corresponding discrete time interval and a booked quantity of items.

3. The method of claim 2, wherein a candidate tuple is only generated
   if, in its corresponding discrete time interval, stock items are available and not previously booked by previously generated candidate tuples, and
   if the sum of all previously booked stock items is smaller than the desired quantity, so that the discrete time interval indicated by the lastly generated candidate tuple is the earliest delivery date for the demand.

4. The method of claim 2, wherein the stock items available are determined on the basis of the aggregated time series, and/or wherein the aggregated time series is determined on the basis of those fact tuples having dates included in the corresponding discrete time interval.

5. The method of claim 2, wherein the step (b) is further characterized in that a candidate tuple is only generated if its corresponding time interval is equal to a desired time interval or next with regard to time to the desired time interval, the desired time interval comprising the desired delivery date.

6. The method of claim 2, wherein the candidate list is generated so that the sum of the booked quantities of items as indicated by the candidate tuple(s) of the generated candidate list equals the desired quantity.

7. The method of claim 2, wherein the step of traversing the aggregated time series comprises the steps of:
   (b1) setting a loop time interval equal to the discrete time interval including the desired date and setting a wanted quantity equal to the desired quantity;
   (b2) setting an accumulated quantity equal to the sum of aggregated changes as indicated by those aggregated tuples that indicate discrete time intervals ranging from the earliest defined discrete time interval to the loop time interval;
   (b3) if the wanted quantity is larger than zero and if the accumulated quantity is larger than or equal to the wanted quantity,
      (b3.1) generating a candidate tuple indicating the loop time interval as its corresponding discrete time interval and the wanted quantity as the booked quantity;
      (b3.2) reducing the accumulated quantity by the wanted quantity;
      (b3.3) setting the wanted quantity equal to zero;
   (b4) if the wanted quantity is larger than zero and if the accumulated quantity is positive and smaller than the wanted quantity,
      (b4.1) generating a candidate tuple indicating the loop time interval as its corresponding discrete time interval and the accumulated quantity as the booked quantity;
      (b4.2) reducing the wanted quantity by the accumulated quantity;
      (b4.3) setting the accumulated quantity equal to zero;
   (b5) if the accumulated quantity is negative,
      (b5.1 reducing the booked quantities of the generated candidate tuple(s) by the accumulated quantity, wherein each candidate tuple indicating a desired quantity of zero is preferably deleted; and
      (b5.2) increasing the wanted quantity by the accumulated quantity;
      (b5.3) setting the accumulated quantity equal to zero;
   (b6) if at least one aggregated tuple exists that indicates a discrete time interval subsequent to the loop time interval,
      (b6.1) setting the new loop time interval equal to the discrete time interval of the aggregated tuple next in time with regard to the aggregated tuple indicating the current loop time interval;
      (b6.2) increasing the accumulated quantity by the quantity indicated by the aggregated tuple indicating the loop time interval; and
      (b6.3) repeating steps (b3) to (b6.3).

8. The method of claim 7, wherein step (b5.1) is further characterized in that the booked quantities of the generated candidate tuple(s) are reduced by processing the candidate list backwards in time, wherein the booked quantities of the lastly generated candidate tuple(s) are reduced first.

9. The method of claim 2, wherein step (a2) is further characterized in that an aggregated tuple is only created if the corresponding discrete time interval includes at least one fact tuple, and wherein the method further comprises the step of:
   (b3) removing those aggregated tuples from the aggregated time series that indicate an aggregated change equal to zero.

10. The method of claim 2, further comprising the steps of:
    (c) generating, for at least one or each generated candidate tuple, a promise entry indicating both a promised quantity of stock items and a promised delivery date; and
    (d) storing the at least one or each generated promise entry in the fact table.

11. The method of claim 2, further comprising the steps of:
    receiving the demand from a customer, prior to step (a); and
    providing the customer with the discrete time interval of the lastly generated candidate tuple as the earliest delivery date for the customer demand, following step (d).

12. The method of claim 1, wherein the method further comprises at least one concurrency control step ensuring that the same stock item is not at least one of promised and booked for different demands.

13. The method of claim 2, wherein the method further comprises concurrency control steps of:
    locking the fact table, prior to step (a), so that other instances of the available-to-promise method cannot access the fact table; and
    unlocking the fact table, subsequent to step (d).

14. The method of claim 2, wherein the method further comprises concurrency control steps of:
    reserving the desired quantity by generating a promise entry indicating the desired quantity as the promised delivery of stock items and the desired date as the delivery date;
    storing the generated promise entry in the fact table, prior to step (a);
    comparing the finally candidate list with the initially generated promise, subsequent to step (b), and, if necessary,
    amending the candidate list, preferably, so that the candidate list complies with new entries in the fact table that have been stored between step of initially generating a promise and the step of comparing the finally generated candidate list with the initially generated promise.

15. The method of claim 2, wherein the method further comprises concurrency control steps of:

identifying the most recently stored entry in the fact table, prior to step (a);

identifying entries stored in the fact table subsequent to the initially identified entry, subsequent to step (b);

controlling the candidate list with regard to the new entries; and, if necessary, amending the candidate list so that the candidate list complies with new entries of the fact table.

16. The method of claim 2, wherein the database is a column store database.

17. The method of claim 2, wherein the database is an in-memory database that employs compression for storing the fact table in memory.

18. The method of claim 2, wherein the database is an insert-only database that employs lazy decompression.

19. A system for determining an earliest delivery date for a demand on the basis of a fact table, wherein the demand indicates both a desired date and a desired quantity for items from a stock, wherein a fact time series is comprised by the fact table and comprises fact tuples indicating both a fact date and a change in quantity of items in the stock that occurred on the corresponding fact date, comprising:

a database system that is configured to store the fact table; and a computer system, connected to the database system, that is configured to execute processing comprising: determining the earliest delivery date for a demand on the basis of the fact table, characterized in that no materialized aggregates are employed for determining the earliest delivery date.

20. A non-transitory computer readable medium storing instructions to control a computer system for determining an earliest delivery date for a demand on the basis of a fact table, wherein the demand indicates both a desired date and a desired quantity for items from a stock, wherein a fact time series is comprised by the fact table and comprises fact tuples indicating both a fact date and a change in quantity of items in the stock that occurred on the corresponding fact date, comprising:

a database component that is configured to store the fact table; and a data processing component, connected to the database component, that is configured to control the computer system to execute processing comprising: determining the earliest delivery date for a demand on the basis of the fact table, characterized in that no materialized aggregates are employed for determining the earliest delivery date.

21. A system for determining an earliest delivery date for a demand on the basis of a fact table, wherein the demand indicates both a desired date and a desired quantity for items from a stock, wherein a fact time series is comprised by the fact table and comprises fact tuples indicating both a fact date and a change in quantity of items in the stock that occurred on the corresponding fact date, comprising:

a database system that is configured to store the fact table; and a computer system, connected to the database system, that is configured to execute processing comprising:

determining the earliest delivery date for a demand on the basis of the fact table, characterized in that the determining includes:

(a) generating an aggregated time series from the fact table by:

(a1) at least one of defining and obtaining discrete time intervals;

(a2) generating, for at least one discrete time interval, an aggregated tuple indicating both its corresponding discrete time interval and the aggregated change in quantity of items in the stock that occurred in its corresponding discrete time interval; and (b) generating a candidate list by traversing the aggregated time series forwards in time and thereby generating, for each discrete time interval, none or one candidate tuple indicating its corresponding discrete time interval and a booked quantity of items.

22. A non-transitory computer readable medium storing instructions to control a computer system for determining an earliest delivery date for a demand on the basis of a fact table, wherein the demand indicates both a desired date and a desired quantity for items from a stock, wherein a fact time series is comprised by the fact table and comprises fact tuples indicating both a fact date and a change in quantity of items in the stock that occurred on the corresponding fact date, comprising:

a database component that is configured to store the fact table; and a data processing component, connected to the database component, that is configured to control the computer system to execute processing comprising:

determining the earliest delivery date for a demand on the basis of the fact table, characterized in that the determining includes:

(a) generating an aggregated time series from the fact table by:

(a1) at least one of defining and obtaining discrete time intervals;

(a2) generating, for at least one discrete time interval, an aggregated tuple indicating both its corresponding discrete time interval and the aggregated change in quantity of items in the stock that occurred in its corresponding discrete time interval; and (b) generating a candidate list by traversing the aggregated time series forwards in time and thereby generating, for each discrete time interval, none or one candidate tuple indicating its corresponding discrete time interval and a booked quantity of items.

* * * * *